US008332782B1

(12) United States Patent  
Chang et al.

(10) Patent No.: US 8,332,782 B1
(45) Date of Patent: Dec. 11, 2012

(54) NETWORK VISUALIZATION AND NAVIGATION

(75) Inventors: Walter Chang, San Jose, CA (US); Nathan Sakunkoo, Stanford, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1326 days.

(21) Appl. No.: 12/035,617

(22) Filed: Feb. 22, 2008

(51) Int. Cl.
*G06F 3/048* (2006.01)
*G06F 3/00* (2006.01)
*G06F 17/30* (2006.01)

(52) U.S. Cl. ........ 715/853; 715/738; 715/834; 715/854; 707/794

(58) Field of Classification Search .............. 715/834, 715/853, 854, 855, 737, 738; 707/794, 805, 707/796
See application file for complete search history.

(56) References Cited

U.S. PATENT DOCUMENTS

| | | | | |
|---|---|---|---|---|
| 5,021,976 | A * | 6/1991 | Wexelblat et al. | 715/853 |
| 5,295,243 | A * | 3/1994 | Robertson et al. | 715/848 |
| 5,619,632 | A * | 4/1997 | Lamping et al. | 345/441 |
| 5,870,559 | A * | 2/1999 | Leshem et al. | 709/224 |
| 6,031,537 | A * | 2/2000 | Hugh | 715/854 |
| 6,166,739 | A * | 12/2000 | Hugh | 715/854 |
| 6,216,134 | B1 * | 4/2001 | Heckerman et al. | 707/749 |
| 6,219,053 | B1 * | 4/2001 | Tachibana et al. | 715/835 |
| 6,356,285 | B1 * | 3/2002 | Burkwald et al. | 715/853 |
| 6,369,819 | B1 * | 4/2002 | Pitkow et al. | 345/440 |
| 6,377,287 | B1 * | 4/2002 | Hao et al. | 715/853 |
| 6,556,983 | B1 * | 4/2003 | Altschuler et al. | 706/55 |
| 6,888,554 | B1 * | 5/2005 | Decombe | 345/645 |
| 6,918,096 | B2 * | 7/2005 | Hugh | 715/854 |
| 6,931,604 | B2 * | 8/2005 | Lane | 715/853 |
| 7,143,392 | B2 * | 11/2006 | li et al. | 717/125 |
| 7,224,362 | B2 * | 5/2007 | Kincaid et al. | 345/440 |
| 7,392,482 | B2 * | 6/2008 | Firebaugh et al. | 715/734 |
| 7,549,309 | B2 * | 6/2009 | Beringer et al. | 70/102 |
| 7,672,950 | B2 * | 3/2010 | Eckardt et al. | 707/999.01 |
| 7,720,857 | B2 * | 5/2010 | Beringer et al. | 707/766 |
| 7,761,549 | B2 * | 7/2010 | Farnham et al. | 709/223 |
| 2002/0055919 | A1 * | 5/2002 | Mikheev | 707/3 |
| 2002/0133392 | A1 * | 9/2002 | Angel et al. | 705/10 |
| 2003/0167324 | A1 * | 9/2003 | Farnham et al. | 709/224 |
| 2004/0010491 | A1 * | 1/2004 | Riedinger | 707/3 |

(Continued)

OTHER PUBLICATIONS

"Introducing Visual Thesaurus Wordlists", http://replay.waybackmachine.org/20001 11_01212/http://visualthesaurus.com/cm/an; retrieved Mar. 9, 2011, p. 1.

(Continued)

*Primary Examiner* — Tadesse Hailu
*Assistant Examiner* — Nicholas Ulrich
(74) *Attorney, Agent, or Firm* — Kilpatrick Townsend & Stockton LLP

(57) ABSTRACT

A display manager allows for visualization and navigation of a semantic network via an interactive graphical user interface. The display manager accesses a semantic network model defining relationships amongst nodes in the semantic network. Given a portion of the semantic network, the display manager renders a radial perspective to represent the node relationships in the given portion of the semantic network. The radial perspective includes a centered node, around which other displayed nodes and relationships are substantially concentrically arranged. To navigate to and view a different portion of the semantic network, the display manager allows the user to select nodes currently displayed in the radial perspective. In response to selection of one or more nodes, the display manager updates the radial perspective to represent nodes and node relationships from a different portion of the semantic network with the user-selected node as a new center node.

33 Claims, 19 Drawing Sheets

U.S. PATENT DOCUMENTS

| | | |
|---|---|---|
| 2004/0030692 A1 | 2/2004 | Leitermann |
| 2004/0030741 A1* | 2/2004 | Wolton et al. ............... 709/202 |
| 2005/0223006 A1* | 10/2005 | Hammeu et al. ............... 707/9 |
| 2006/0212490 A1* | 9/2006 | Takahashi et al. ............ 707/201 |
| 2007/0022000 A1* | 1/2007 | Bodart et al. ................ 705/10 |
| 2007/0038594 A1* | 2/2007 | Goodwin et al. ............... 707/2 |
| 2007/0156677 A1 | 7/2007 | Szabo |
| 2008/0104225 A1* | 5/2008 | Zhang et al. ............... 709/224 |
| 2009/0024747 A1* | 1/2009 | Moses et al. ............... 709/228 |
| 2009/0171630 A1* | 7/2009 | Augusto et al. ............... 703/2 |

OTHER PUBLICATIONS

"Introducing Visual Thesaurus Wordlists", http://replay.waybackmachine.org/20070221200601/http://www.visualthesaurus.com/cm/an; retrieved Mar. 9, 2011, pp. 1-2.

Office Action dated Mar. 18, 2011 in U.S. Appl. No. 12/035,629.

* cited by examiner

NETWORK VISUALIZATION AND NAVIGATION

RELATED APPLICATIONS

This application is related to U.S. patent application entitled "NAVIGABLE SEMANTIC NETWORK DEFINITION, MODELING, AND USE," Ser. No. 12/035,629, filed on the same day as the present application, the entire teachings of which are incorporated herein by this reference.

BACKGROUND

In general, semantic networks provide a way to convey relationships between different entities. For example, a semantic network can include a number of resource nodes. Links between the resource nodes in a semantic network indicate a relationship from one resource to another.

If presented properly, the semantic network can be very useful for identifying relationships between the same or different types of resources. For example, a node of a semantic network can represent a core idea. The core idea may not be adequately described via use of a mere label specifying the core idea.

Use of a semantic network enables one to easily display additional information associated with the core idea. As an example, information associated with a core idea node can be represented as additional nodes in the semantic network. Such additional nodes can represent information such as documents, text, pictures, links to websites, etc. associated with the core idea. However, semantic networks are more general than simpler representations such as trees and tables.

A presence of links between the core idea node and other nodes enables a viewer to quickly identify a degree to which the additional is related to the core idea. For example, a direct link between a satellite node and a core node can indicate that the satellite node is closely related to the core idea. Nodes that are present in the semantic network but that are not directly connected to the core idea node can represent more tangential concepts.

One type of network is a social network. Typically, social network services employ social software to allow users to come together online around shared hobbies, or causes. Users can search for and connect with other users according to attributes such as location, age, gender, etc.

As more user profiles are added and become linked to other user profiles, a vast virtual community is created and defined according to the numerous linkages between the users and the commonalities of the users' attributes. Often, such social network services leverage such linkages and attributes to better manage their virtual communities and to provide better communication and information sharing between the users.

Another type of software application to manage resources is a conventional human resource management system. Such conventional resource management systems are used to keep track of employees in an organization. More sophisticated human resource management systems enable a corresponding administrator to keep track of additional information related to the employees.

Yet another type of software application to search for human resources is an expertise location system which is used to locate employee expertise or key skills from within an organization.

SUMMARY

Conventional social network services and resource management systems suffer from a variety of deficiencies. Specifically, conventional social network services and conventional resource management applications in general do not provide a visualization and navigation feature to refine and view complex relationships that exist within their social network or network of resources.

For example, conventional social network websites such as MySpace.com and Facebook.com allow a user to view another user's profile. The profile includes a listing of the other user's "friends"—additional user's who also have profiles on the conventional social network service. However, the listing does not provide a visual description of the basis of the friendship. In other words, the listing informs the user of the existence of a friendship (i.e. a social connection, a network linkage) but does not provide information as to what the two friends have in common or why the two friends are directly linked within the social network. Thus, in such a case, the user will not know whether some "friends" are actually family members, classmates, professional contacts, online pen pals, etc.

In order to obtain additional information about the other users' "friends," each of the friends' profiles must be accessed one at a time. Individually accessing each "friend" profile is time intensive and forces the user to remember all the "friends" listed in the other user's profile or requires that that the user repeatedly return to the friend listing.

Yet another deficiency is found in conventional social network websites with regard to navigating the social network itself. Specifically, navigation is limited to sequential browsing of linked profiles. There is no way to navigate to a profile that lacks a direct linkage with a currently displayed profile—even if both profiles share a common domain of profile attributes.

In the context of a conventional resource management system in an organization, such as a corporation, the ability to navigate about the conventional resource management system and view information related to the human resources (e.g. employees) is often similarly limited.

Techniques discussed herein significantly overcome the deficiencies of conventional applications. As will be discussed further, certain specific embodiments herein are directed to a display manager (and related functions). The one or more embodiments of the display manager as described herein contrast with conventional systems to allow a user to (more easily and efficiently) navigate about and view different portions of a semantic network via an interactive graphical user interface (G.U.I.). The interactive G.U.I. allows the user to view one or more portions of a navigable semantic network rendered as a radial perspective of one or more nodes. Each of the nodes in the radial perspective represent information in the semantic network. Branches amongst the nodes are included in the radial perspective to indicate direct and indirect relationships between the nodes.

A user may initiate navigation amongst or through portions of the semantic network via user selection of one or more nodes in a currently displayed radial perspective. For example, when the user selects a node from a currently displayed radial perspective, the display manager updates the radial perspective to allow the user to view a different portion of the semantic network. The newly updated perspective can include nodes and node relationships associated with the resource represented by the selected node. Thus, which portion of a semantic network is subsequently displayed on a display screen depends upon which of one or more resources are selected in a currently displayed radial perspective in the navigable semantic network.

More specifically, in one embodiment, a display manager renders a graphical user interface to include a first radial perspective of a portion of a semantic network as viewed from a first node of the semantic network. The semantic network is based on a semantic network model that defines relationships amongst multiple nodes in the semantic network. As mentioned above, the display manager can receive a selection of a second node of the semantic network, which is displayed in the first radial perspective. In response to receiving the selection of the second node, the display manager updates the graphical user interface to include a second radial perspective of a portion of the semantic network as viewed from the second node of the semantic network. Updating the graphical user interface can include displaying the second radial perspective in lieu of displaying the first radial perspective.

Thus, based on successive or subsequent selection of different nodes from one radial perspective (e.g., view of the semantic network) to another, a user can "walk" through the semantic network to view different resources and their relationship with other resources in the semantic network.

In a specific embodiment in which the navigable semantic network includes multiple nodes, some nodes can represent human resources or related information such as areas-of-expertise, areas-of-interest, documentation, etc. Links between the nodes can indicate relationships amongst the resources, which are represented by the different nodes.

In order to identify expertise information and related information associated with a selected resource (e.g., a node) displayed in the navigable semantic network, the display manager accesses a corresponding semantic network model. In one embodiment, the semantic network model includes node information indicating which portion (e.g., a selected node and related node) of the semantic network to display as well as which node relationships are relevant to the selected resource.

Based on selection of a node (e.g., an element representing a resource) in a currently displayed navigable semantic network, the display manager accesses the semantic network model to identify what portion and how to display a subsequent portion of the navigable semantic network in a graphical user interface. Thus, the navigable semantic network can be continually updated to display different portions of the semantic network.

As a viewer of the navigable semantic network repeatedly selects resource nodes in the navigable semantic network from one displayed portion of the semantic network to another, the user can "walk" through the semantic network and view resources from different perspectives. For example, in one embodiment as discussed above, upon selection of a node (e.g., resource) in a displayed portion of a semantic network, the display manager updates a subsequent view of the semantic from a perspective of the selected node. The subsequent view of the semantic network can include new periphery nodes (e.g., resources) that were not displayed in the previously displayed portion of the semantic network. This provides the user with a visualization of "walking" through the semantic network.

In one example embodiment of the display manager, a semantic network model defines relationships amongst different resource nodes such as employee nodes, company nodes, project nodes, product nodes, interest nodes, and skills (i.e. expertise) nodes in a semantic network for an organization. Upon selection of the different resource nodes in the navigable semantic network, the display manager updates the displayed portion of the semantic network. The focal point of a currently displayed portion of the navigable semantic network varies depending on what type of resource node is selected by a viewer. In other words, a viewer can initially select and view a supervisor and subordinates. Upon selection of subordinates and resource nodes (e.g., product nodes on which the subordinates are affiliated) related to the subordinates, the viewer can expand or change which portion of a navigable semantic network is currently displayed for viewing.

Assume that a navigable semantic network includes different nodes such as human resource nodes (e.g., nodes representing resources such as employees), area of interest nodes (e.g., node representing employee interests), area-of-expertise nodes (e.g., nodes representing different areas of expertise), project nodes (e.g., nodes representing different projects associated with the organization), etc. Links between the nodes can be different colors. For example, yellow colored links amongst nodes can represent supervisor/subordinate employee relationships, blue colored links amongst nodes can represent employee/area-of-interest relationships, gray colored links amongst nodes can represent employee/project relationships, etc. Thus, a navigable semantic network can include a layering (as identified by visually distinguishable types of links) of a number of different types of network resources. In other words, the semantic network can be a network of networks.

In one embodiment, given a particular node, such as a node representing an organization's Chief Executive Officer (C.E.O.), the display manager creates a radial perspective to display nodes in the semantic network that have a relationship with the C.E.O. node. The radial perspective provides the user with a graph of the related nodes substantially concentrically aligned around the C.E.O. node. Thus, according to embodiments herein, a user can be provided with context as to those employees, products, projects, companies, interests and skills that are proximately, directly related and proximately, indirectly related with the C.E.O. in the semantic network.

The display manager situates the C.E.O. node at the center of the radial perspective and provides visually distinct graphical branches that emanate outward from the centered C.E.O. node to various related nodes. Yellow branches emanate to employee nodes to represent a hierarchical relationship between the C.E.O and subordinate employees. Additionally, yellow branches emanate from the subordinate employees to nodes representing their subordinates.

Gray branches emanate from the C.E.O node to project nodes that represent projects in which the C.E.O. is directly involved. The project nodes themselves can have additional gray branches to employee nodes that represent employees involved in the project but may not be proximately subordinate to the C.E.O. in the semantic network.

Still, blue branches can emanate from the C.E.O. node to interest nodes that represent the C.E.O's current interests. The interest nodes can have additional blue branches to employee nodes that represent employees that share a common interest with the C.E.O. but may not be proximately subordinate to the C.E.O. in the semantic network.

The display manager allows a user to navigate the organization's semantic network by selection of any node displayed in the radial perspective. In response to the user selecting a node, the display manager dynamically updates the radial perspective to display new nodes that have a relationship with the selected node.

If the user selects an employee node that represents a subordinate of the C.E.O., such as a node representing the organization's Legal Counsel (L.C.), the display manager dynamically updates the radial perspective to display nodes from the semantic network that are more closely related with the L.C. than the C.E.O.

To dynamically update the radial perspective, the display manager situates the L.C. node at the center of the radial perspective instead of the C.E.O. node. The display manager displays a visually distinct graphical branch emanating outward from the newly-centered L.C. node to the C.E.O. node in order to represent the L.C.'s subordinate relationship with the C.E.O. Those nodes previously displayed in the radial perspective, based on some relationship with the C.E.O. node, disappear. New visually distinct graphical branches emanate from the newly-centered L.C. node to those nodes that have a close relationship with the L.C. node.

In order to display the nodes that are related with the L.C. node, the display manager accesses a different portion of the organization's semantic network than the portion accessed for nodes related with the C.E.O. node.

The display manager enables the user to navigate down a hierarchical level in the organization's semantic network by allowing the user to select the L.C. node. By updating the radial perspective in a manner as discussed herein, the user is provided with context as to those employees, products, projects, companies, interests and skills that are proximately, directly related and proximately, indirectly related with the L.C. in the semantic network. These and other embodiments are discussed in more in the detailed description below.

Embodiments disclosed herein can include any type of computerized device, workstation, handheld or laptop computer, or the like configured with software and/or circuitry (e.g., a processor) to process any or all of the method operations disclosed herein. In other words, a computerized device such as a computer or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a display manager, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
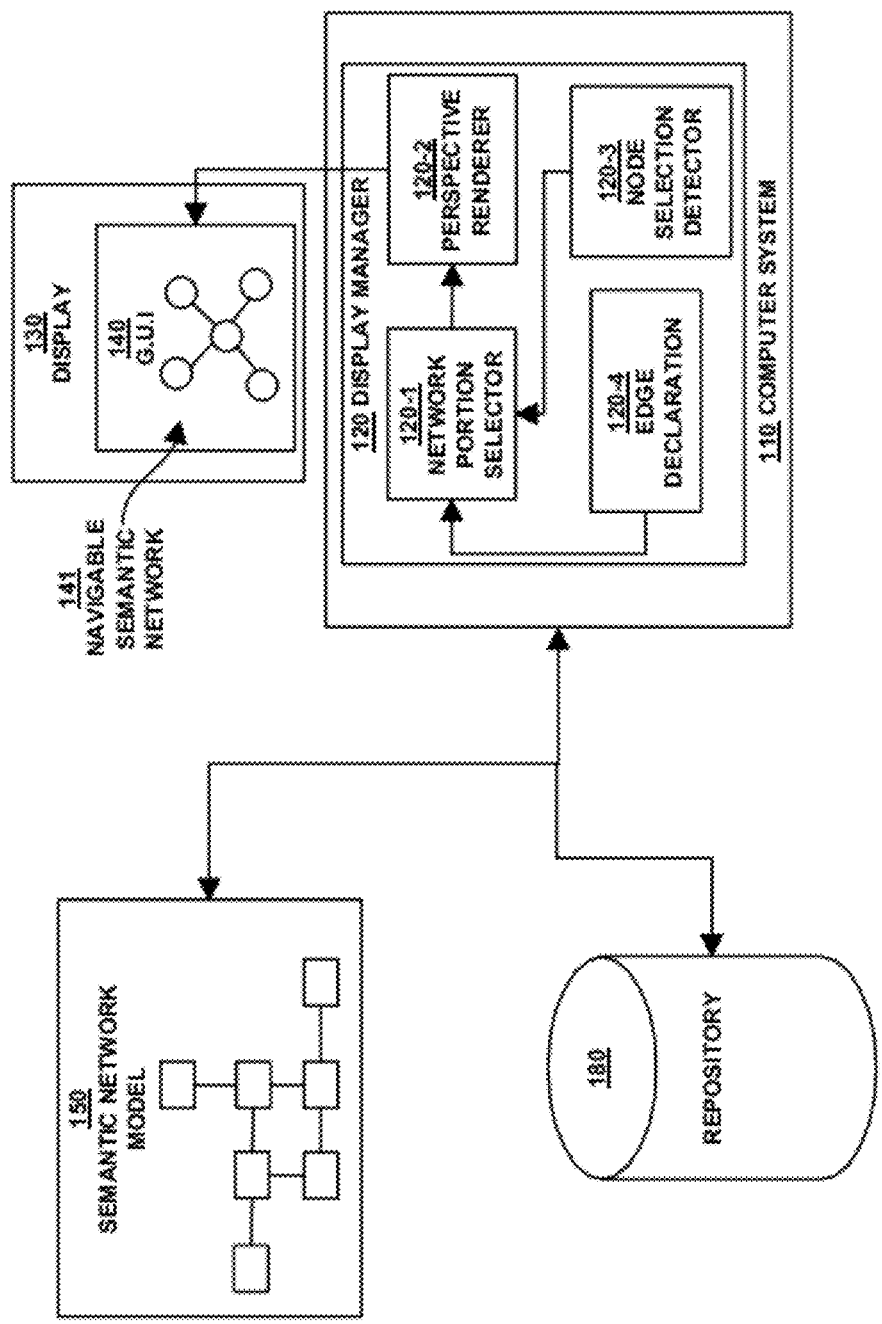
FIG. 1 is an example block diagram of a computer system configured with a display manager according to embodiments herein.

FIG. 1 is an example block diagram of a computer system 110 configured with a display manager 120 according to embodiments herein. Computer environment 100 includes a semantic network model 150, a repository 180, a display screen 130, and a computer system 110. Display screen 130 displays a navigable semantic network 141 in graphical user interface 140. Computer system 110 includes a display manager 120. Display manager 120 includes a network portion selector 120-1, perspective renderer 120-2, edge declaration 120-4, and node selection detector 120-3. In general, computer environment 100 enables display of views and navigation with respect to a semantic network as defined by semantic network model 150. The semantic network model 150 includes information associated with each of multiple nodes in a semantic network. Each node in the semantic network model 125 can include node information such as: i) location information where data associated with a respective node can be found in a remote storage location, ii) display rule information indicating how to display the respective node when so rendered in a graphical user interface, and iii) relationship information indicating neighboring nodes related to the respective node, and iv) command information indicating different type of input (e.g., navigation commands) that can be applied to the respective node. The display manager 120 initiates display of different views of the semantic network by accessing the semantic network model 150 and data in repository 180.

More specifically, the display manager 120 allows for the visualization and navigation of portions of a semantic network via a navigable semantic network 141 displayed in an interactive graphical user interface (G.U.I.) 140.

To provide the navigable semantic network 141, a network portion selector 120-1 accesses a semantic network model 150 in order to identify a portion of the semantic network that will be rendered for viewing in the graphical user interface 140.

As mentioned, the semantic network model 150 defines relationships amongst the nodes in the semantic network. For example, in one embodiment, the semantic network model 150 can describe relationships among employee nodes in an organization's expertise system. Thus, the semantic network model 150 can describe hierarchical relationships amongst the employees and can define groupings of employees based on a shared domain attribute, such as a common area of interest, a project group, a product group, and a common area of expertise.

The semantic network model 150 also provides an edge declaration 120-4 to the display manager 120. For any particular node in the semantic network, the edge declaration 120-4 describes those nodes and node relationships in the semantic network that are proximate to the particular node. By utilizing the edge declaration 120-4, the network portion selector 120-1 identifies a portion of the semantic network that includes a subset of nodes that are proximately related to each other. The network portion selector 120-1 obtains the subset of nodes from the semantic network and their node relationships from the semantic network model 150.

Upon identifying a portion of the semantic network, the perspective renderer 120-2 populates the navigable semantic network 141 with the subset of nodes to render a radial perspective. The radial perspective thereby represents the nodes and node relationships that exist in the portion of the semantic network identified by the network portion selector 120-1. The radial perspective includes a centered node, around which other displayed nodes and node relationships are arranged in a circular manner.

In addition, the display manager 120 can provide access to content associated with the nodes displayed in the radial perspective. A repository 180 stores the content and provides the content to the display manager 120 for display in the interactive G.U.I. 140.

In one embodiment, for each employee node currently displayed in the radial perspective, the display manager 120 provides links to documents created by each employee. If a user selects a link, the repository 180 allows one or more documents that correspond with the link to be viewed in the interactive G.U.I. 140.

The radial perspective provided in the navigable semantic network 141 can be updated in response to user activity (e.g., navigation input provided by a user operating graphical user interface 140).

The node selection detector 120-3 monitors user input and detects user selection of one or more nodes currently displayed in the radial perspective. Upon detecting that the user has selected a node, the node selection detector 120-3 provides the network portion selector 120-1 with the identity of a user-selected node. The network portion selector 120-1 can thereby identify a new portion of the semantic network that will be rendered in an updated radial perspective displayed in graphical user interface 140. For example, by utilizing the edge declaration 120-4 with respect to the user-selected node, the network portion selector 120-1 identifies the new portion of the semantic network that has a subset of nodes that are proximately related to the user-selected node. In one embodiment, the display manager 120 accesses node information in the semantic network model m150 associated with the user-selected node to identify how to render the selected node and corresponding related nodes for viewing in graphical user interface 140.

Note that additional details about utilizing information in the semantic network model 150 to generate a view can be found in related application entitled "NAVIGABLE SEMANTIC NETWORK DEFINITION, MODELING, AND USE," Ser. No. 12/035,629, filed on the same day as the present application, the entire teachings of which have been incorporated herein by this reference as mentioned above.

After generating view information to render the new portion of the semantic network, the perspective renderer 120-2 renders the updated radial perspective in the navigable semantic network 141 to represent the nodes and node relationships in the new portion of the semantic network. The updated radial perspective includes the user-selected node as its focal node (e.g., centered node). The nodes and node relationships that are proximately related with the user-selected node can be arranged in a circular, elliptical, radial, etc. manner around the user-selected node.

Thus, by updating the radial perspective in the navigable semantic network 141, the display manager allows the user to navigate to and view a different portions of the semantic network.

Figure 2:
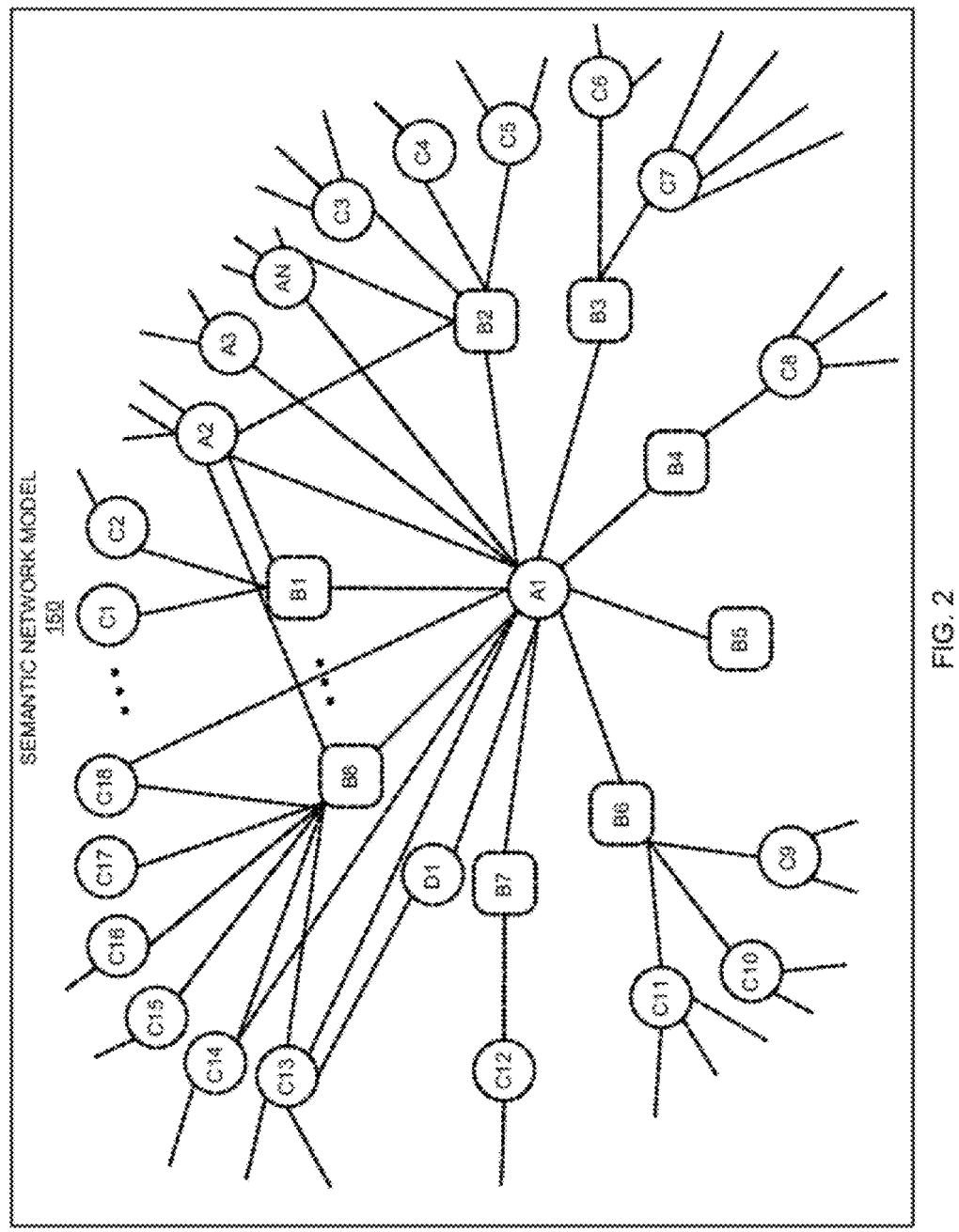
FIG. 2 is an example diagram illustrating a semantic network model according to embodiments herein.

FIG. 2 is an example diagram illustrating a semantic network model 150 according to embodiments herein. As shown, the semantic network model 150 includes a complex network of related nodes including nodes A1, A2, A3, . . . AN as well as nodes B1, B2, B3, B4, B5, B6, B7, B8, C1, C2, C3, C4, C5, C6, C7, C8, C9, C10, C11, C12, C13, C14, C15, C16, C17, C18, and so on.

Links (e.g., dotted lines) represent relationships between the nodes. This semantic network model 150 can include any number of nodes and relationships. The semantic network model 150 can include multiple networks of interconnected or related nodes. Thus, there is generally no limit as to the number of nodes and complexity of the semantic network model 150.

The nodes in semantic network model 150 can represent any type of resource information. For example, assume in this example that each of nodes A1, A2, A3, etc. represents different employees in an organization. Each of nodes B1, B2, B3, etc. can represent different areas-of-expertise associated with employee A1. Each of nodes C1, C2, C3, C4, etc. can represent other employees in the organization. Other nodes can represent other types of resources such as documents, companies, etc. Certain nodes in the semantic network model 150 can form part of a hierarchy. Other nodes may not have any hierarchical relationship to other nodes in the semantic network model 150.

Links emanating radially outward from nodes represent relationships between nodes. For example, the links emanating radially outward from node B8 indicate relationships with other employees (e.g., employees as represented by nodes A1, C13, C14, C15, C16, C17, and C18) who share the area-of-expertise as represented by node B8. Thus, in one embodiment, the semantic network model 150 can include a heterogeneous mix of different node types and node relationships. In other words, and as mentioned above, not every node in the example semantic network model 150 needs to represent a same type of resource such as an employee.

However, note that in other embodiments, each of the nodes in the semantic network model 150 can represent a common type of resource such as an employee in an organization.

Each node in the semantic network model 150 has related information about the node. The related information (as discussed in FIG. 3) enables the display manager 120 to initiate display of the node and related nodes on display 130.

Figure 3:
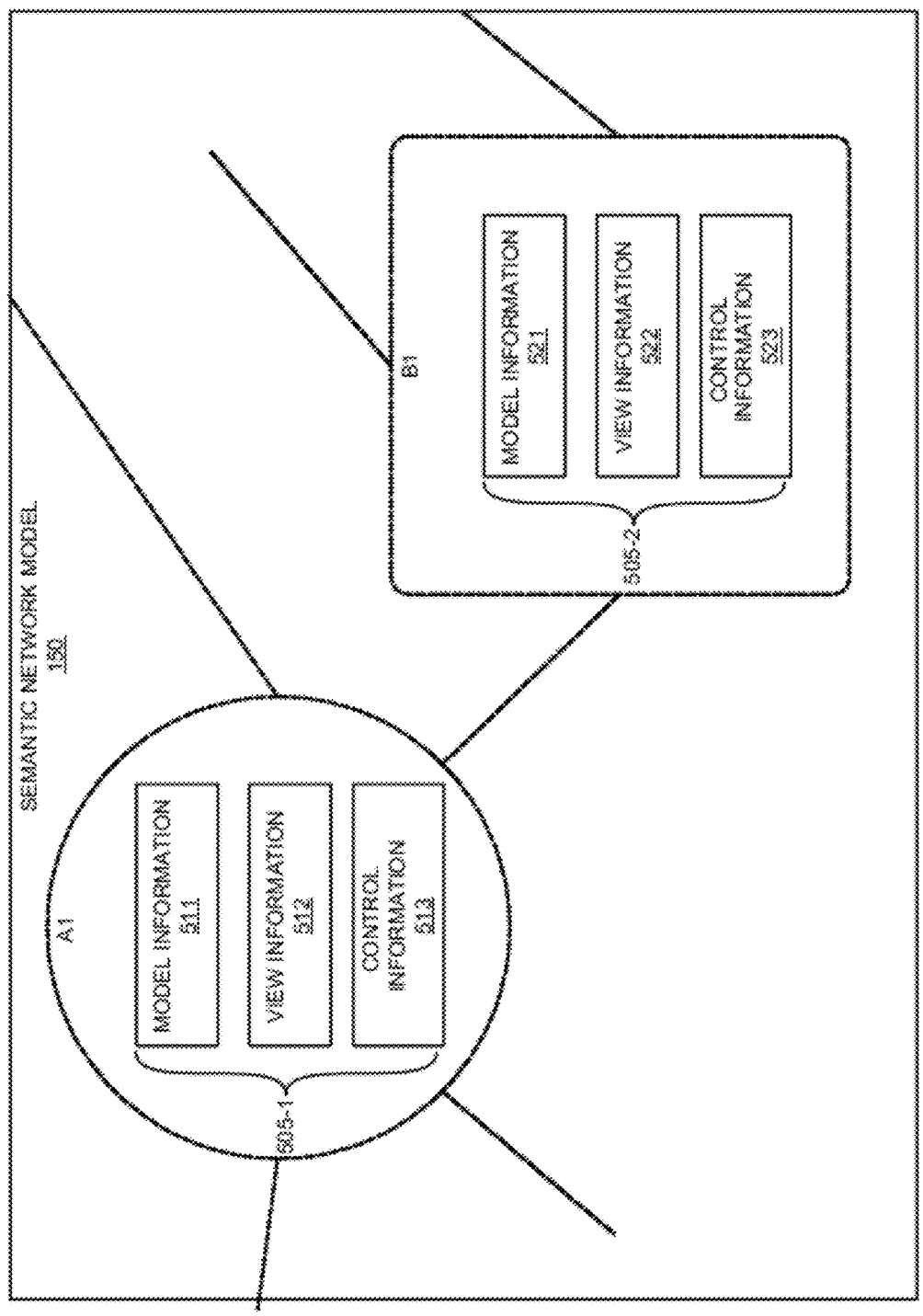
FIG. 3 is an example diagram illustrating types of information maintained for each node in the semantic network model according to embodiments herein.

More specifically, FIG. 3 is an example diagram illustrating types of information maintained for each node in the semantic network model 150 according to embodiments herein. For example, each node (e.g., internal nodes and edge nodes of the corresponding semantic network) has corresponding model information, view information and control information maintained in the semantic network model 150.

The perspective renderer 120-2 (e.g., view instantiation engine) uses the node information 505 to instantiate different portions of the semantic network for display by display manager 120.

In the context of the present example, node A1 has corresponding node information 505-1, which includes model information 511, view information 512, and control information 513. Node B1 has corresponding node information 505-2, which includes model information 521, view information 522, and control information 523. In a similar manner, each node of the other nodes in the semantic network model 150 has corresponding model information, view information, and control information.

In one embodiment, the data MODEL information (e.g., model information 511, 521, etc.) associated with a corresponding node defines a corresponding structure of the semantic network including relationships of the subject node with other nodes in the semantic network. The data MODEL information can specify object data classes, attributes, database tables, database columns, etc. (in storage 185 such as a federation of databases) that contain corresponding node data and node relationship information.

For example, the model information 511 (e.g., data MODEL information) for node A1 includes data or information enabling the perspective renderer 120-2 to identify that node B1 is related to node A1 and a type of relationship between node A1 and B1. In other words, the model information 511 identifies other nodes in the semantic network model 150 that are related to node A1. Based on identification of the other nodes as specified by the model information 511, the perspective rendered 120-2 then can access node information of the related nodes by accessing model information, view information, and control information associated with those other nodes. In the present example, the model information 511 would indicate that nodes B1, B2, B3, B4, B5, B6, B7, B8, D1, C13, C14, and so on are related to node A1.

Thus, by accessing node information for each of the nodes, the perspective renderer 120-2 can learn about a given node and any number of related nodes in the semantic network model 150. In other words, the perspective renderer 120-2 access node information associated with other nodes in the semantic network model 150 to learn how to display the related nodes, commands that can be applied to the related nodes, etc.

Typically, the perspective renderer 120-2 accesses and processes information associated with a portion or subset of the nodes (rather than every node) in the semantic network model 150 for viewing by a respective user.

For example, as will be discussed later in this specification, a user can select a focal node. In response to the selection, the perspective renderer 120-2 accesses the (node information 505) model information, view information, and control information for the focal node. The perspective renderer 120-2 also accesses the (node information 505) model information, view information, and control information for a number of nodes directly and indirectly (e.g., nearby nodes) related to the one or more focal node.

As mentioned, the number of nodes (and corresponding node information 505) processed by the perspective renderer 120-2 can depend on what the node information 505 states and/or input provided by a respective viewer. For example, the node information 505 associated with a given node in the semantic network model 150 can indicate which other related nodes to simultaneously display in a view on display screen 130. A user may also provide input to indicate which node and a scope of related nodes to simultaneously display on display screen 130. The scope may be large or small depending on how much information would like to be viewed by the user.

As mentioned above, the node information 505 for a respective also includes corresponding view information. The view information 512 describes how each of multiple display elements (e.g., text, node body, links, etc.) for the node will be presented or rendered in the corresponding view to be displayed on display screen 130. More specifically, in one embodiment, the view information 512 include attributes indicating how nodes in the semantic network will appear, how nodes are titled, how attribute values appear, and how links/edges between nodes are drawn (color, thickness, etc.). Additionally, Icon and Detailed Views can be supported to show varying levels of information depending on selection focus.

Recall again that the model information associated with a node can identify where the information to instantiate a node is stored in a respective repository. The, the semantic network model 150 need not store every detail of the semantic network locally in a repository such as memory.

Thus, the view information associated with each respective node can include display rules associated with the semantic network. As their name suggests, the display rules can define how to display different resource nodes and relationships amongst the different resource nodes in the navigable semantic network.

The node information 505 also can include CONTROLLER information indicating commands that can be applied to the corresponding node and corresponding actions to be executed in response to a command. The listing of commands can include commands to change an object focus, use a different graph, etc. Other commands include commands for "actionable" nodes to initiate an e-mail, hide a node, or make an annotation. Thus, the controller information can identify: i) different navigation input commands that can be applied to respective resources (e.g., nodes, links, etc.) of the semantic network to navigate about different views of the semantic network, and ii) different actions to be taken in response to receiving the navigation input commands from a user navigating the semantic network model 150.

In accordance with view information associated with a respective node, relationships between the nodes of the different network in the semantic network can be conveyed via different colored links. For example, links between nodes in a first network of the semantic network can be yellow (when so displayed), links between nodes in a second network of the semantic network can be red (when so displayed), and so on.

Links between nodes in the first network and nodes in the second represent "crossover" links from the first network to second network. Thus, according to embodiments herein, a viewer can traverse amongst nodes in different networks by selecting appropriately displayed nodes displayed in the graphical user interface 140.

It should be noted that the Model-View-Controller paradigm (e.g., semantic network description based on node information 505 as discussed above) can be extended to support multiple interconnected graphs of sub-models to create and aggregate increasingly more comprehensive and sophisticated semantic network graphs.

Operations associated with the perspective renderer 120-2 can be summarized as follows:

Accessing the semantic network model 150 can include: i) identifying, in the semantic network model 150, resource node information 505 associated with a given resource node (e.g., a selected focal node of the semantic network model 150), ii) based on the resource node information 505 for the given node, identifying a group of neighboring resource nodes in the semantic network model 150 related (e.g., linked) to the given resource node, and iii) identifying resource node information associated with the group of neighboring resource nodes.

Instantiating the portion of the navigable semantic network from the perspective of the given resource node in the navigable semantic network can include generating the instantiated portion of the navigable semantic network in accordance with i) the resource node information associated with the given resource node as indicated in semantic network model 150, and ii) the resource node information associated with the group of neighboring resource nodes.

Figure 4:
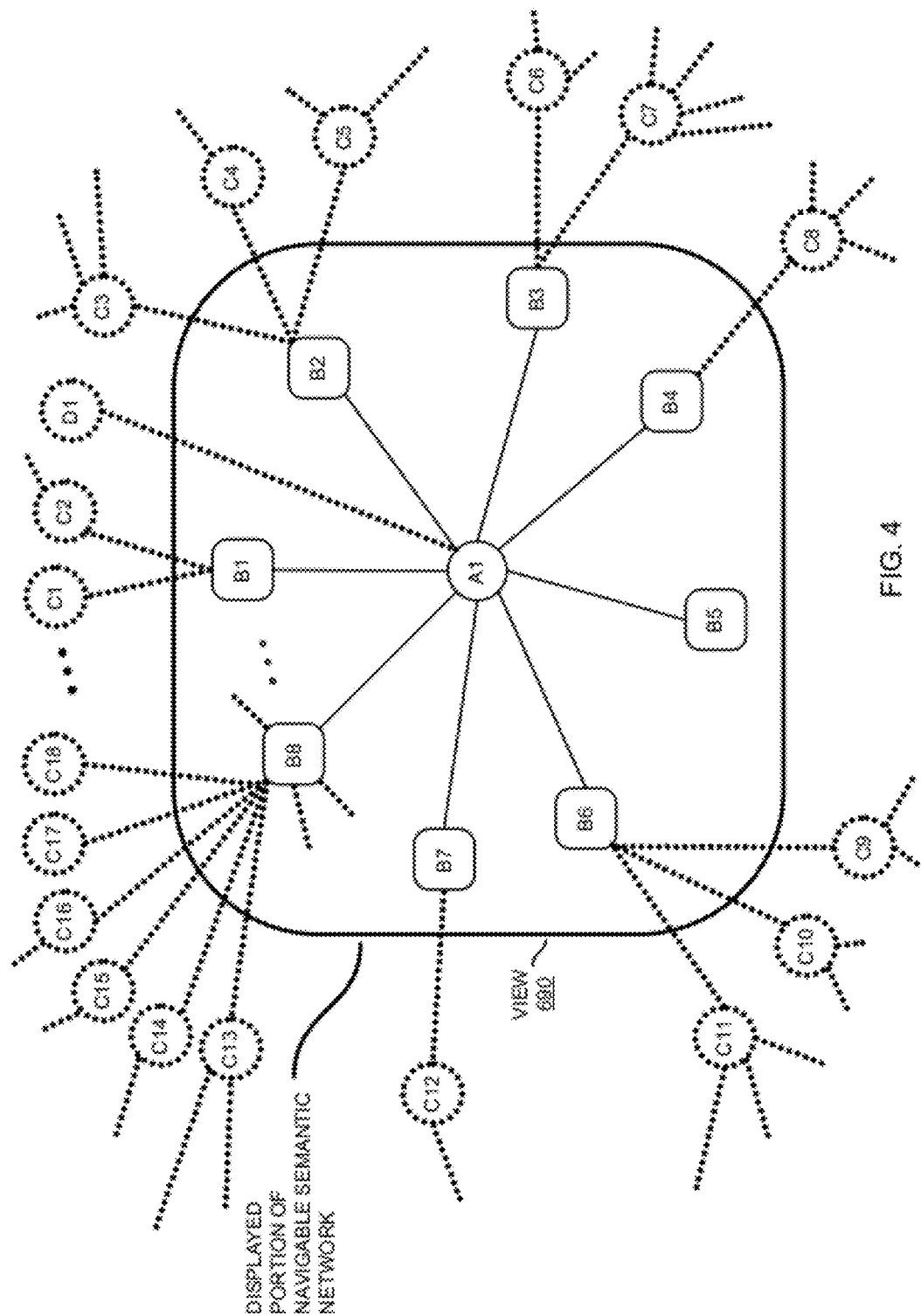
FIG. 4 is an example diagram illustrating a viewed portion of the semantic network according to embodiments herein.

FIG. 4 is an example diagram illustrating a viewed portion of the semantic network according to embodiments herein. Assume that the viewer of display screen 130 selects node A1 as a focal node for display in graphical user interface 140 on display screen 130. In response to such selection, the perspective renderer 120-2 instantiates a portion of the semantic network including node A1 and related nodes for display by display manager 120 on display screen 130.

To create the view 690 for display on display screen 130, the view instantiation engine 140 accesses node information 505-1 associated with node A1. As previously discussed, the node information 505-1 indicates instantiation information associated with node A1 such as which nodes are related to node A1, how to display node A1 in a respective view, where to find data in storage 185 to create a corresponding visual representation of the node, etc.

The related nodes may include nodes that are directly related to node A1. These include first level nodes B1, B2, . . . , B8. In the context of the present example, the view 690 is limited to first level nodes associated with node A1. Thus, second level nodes such as C1, C2, . . . , C18 are not shown (e.g., they are hidden) in view 690.

For each node of the first level related nodes (e.g., nodes B1, B2, . . . , B8) to be displayed in the view 690, the view instantiation engine 140 accesses corresponding node information in the semantic network model 150 to identify how to display such nodes, where to find data for creating the nodes, commands that can be applied to the nodes, etc. The node information 505 for each node can specify dif easy to display the corresponding node depending on whether the node is a focal or non-focal node in a view.

In accordance with the node information for the nodes in the semantic network model 150 and corresponding data in repository 180, the perspective renderer 120-2 creates a bitmap or definition (e.g., instantiated portion of semantic network 145) associated with view 690. The display manager 120 uses the bitmap to render view 690 on the display screen 130.

As shown, the solid lines in view 690 represent what graphical elements appear on the display screen 130 for viewing by a user. Graphical elements rendered via dotted lines represent hidden nodes in the semantic network model 150 associated with the viewed nodes. The hidden nodes are not currently displayed on the display screen 130. Thus, the display manager 120 can at least initially display a limited portion of a semantic network about a selected node rather than display every possible node at the same time in view 690. In other words, certain nodes can be hidden so that the view 690 of node is not cluttered with an excessive amount of information.

A user viewing view 690 on display screen 130 can provide different types of input with respect to the view 690. For example, a user can apply zoom commands (e.g., zoom in and zoom out commands) to view larger or smaller portions of the semantic network, hide commands to remove certain selected elements from a view, show commands to display hidden graphical elements (e.g., nodes, links representing relationships, labels, text, etc.), selection commands specifying a new node to be a focal node for the view, etc.

Assume in the present example that a user selects (e.g., clicks on) node B8 displayed in view 690. In response to such an action, the display manager 120 notifies the perspective renderer 120-2 of such a selection. The perspective renderer 120-2 utilizes the node 505-1 (e.g., controller information 513) to identify what action to take in response to receiving the command. In this example, assume that the controller information 513 indicates that an action to be taken in response to selection of node B8 will include updating the view 690 displayed in the graphical user interface 140 so that the selected node is now a centroid or a focal node in an updated view (rather than A1 being a focal node).

Since node B8 will now be a focal node in the updated view, the perspective renderer 120-2 accesses node information (in the semantic network model 150) associated with node B8. In a manner as discussed above, the perspective renderer 120-2 identifies which nodes in the semantic network model 150 are directly (and possibly indirectly depending on user input) related to the node B8. In the present example, based on the corresponding node information associated with node B8, the view instantiation engine would identify that nodes A1, C13, C14, C15, C16, C17, and C18 are all nodes directly related (e.g., have a direct link) to node B8 and instantiates a new view in accordance with these nodes.

Figure 5:
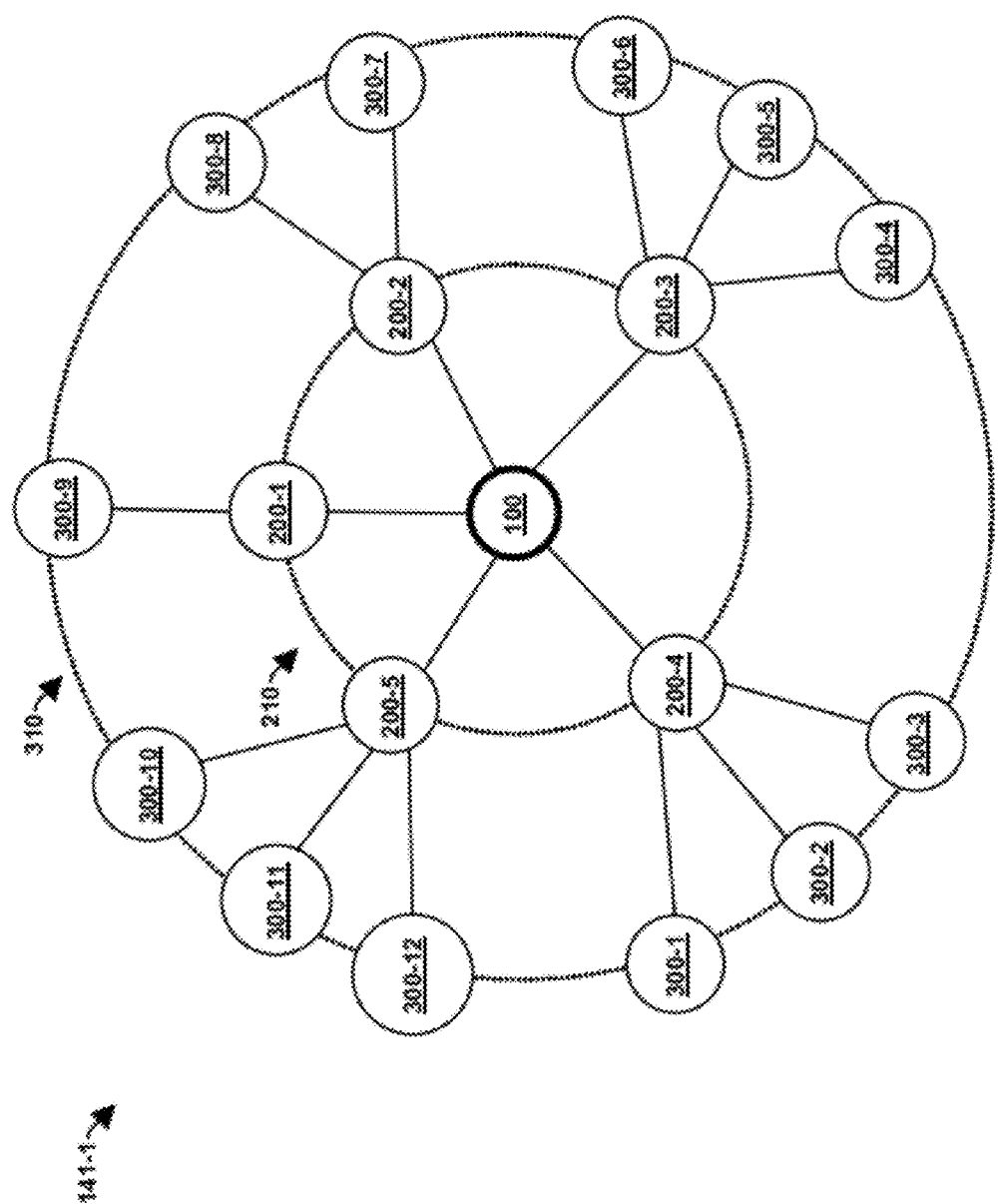
FIG. 5 is an example diagram of a perspective of a navigable semantic network rendered by a display manager according to embodiments herein.

Turning now to FIG. 5, FIG. 5 is an example diagram of a perspective 141-1 of a navigable semantic network 141 rendered by a display manager 120 according to embodiments herein.

The display manager 120 situates a particular node 100 at or around the center, focal point, origin, etc. of the radial perspective 141-1, which includes satellite nodes 200-1, 200-2, 200-3, 200-4, 200-5. The satellite nodes 200-1 . . . 200-5 are located in an orbit around the center node 100 along a substantially concentric path 210. It is understood that the satellite nodes 200-1 . . . 200-5 can represent human resources or expertise information in an expertise system. Such expertise information can be a project group, a product group, an interest group, or an area of expertise.

Visually distinct graphical branches emanate outward from the center node 100 (e.g., focal node, selected node, node of interest, etc.) to the satellite nodes 200-1 . . . 200-5. The visually distinct graphical branches (e.g., links between nodes) represent relationships between the center node 100 and satellite nodes 200-1 . . . 200-5 as defined in a semantic network model 150.

For example, the graphical branches emanating outward from the center node 100 to the satellite nodes 200-1 . . . 200-5 (e.g., nodes representing subordinates) can be of a particular color to represent that the satellite nodes 200-1 . . . 200-5 are subordinate to the center node 100 (e.g., a node representing a supervisor) in a hierarchy of the expertise system. That is, in one embodiment, node 100 can represent a manager and satellite nodes 200-1 . . . 200-5 represent employees who report to the manager.

In addition, the radial perspective 141-1 includes additional satellite nodes 300-1, 300-2, 300-3, 300-4, 300-5, 300-6, 300-7, 300-8, 300-9, 300-10, 300-11, and 300-12 that are related to satellite nodes 200-1 . . . 200-5.

In one embodiment, the display manager 120 displays the additional satellite nodes 300-1 . . . 300-12 along a substantially concentric or elliptical path 310 around the center node 100.

Visually distinct graphical branches emanate outward from the satellite nodes 200-1 . . . 200-5 to the additional satellite nodes 300-1 . . . 300-12 to represent relationships amongst the nodes 200-1 . . . 200-5, 300-1 . . . 300-11 as well. For example, satellite node 200-1 can represent a mid-level manager; additional satellite node 300-9 can represent an employee who reports to the mid-level manager, and so on. Thus, the branch between the nodes 200-1, 300-9 represents a hierarchical relationship between the nodes 200-1, 300-9.

To update the radial perspective 141-1, the display manager 120 allows a user to select any of the satellite nodes 200-1 . . . 200-5 and additional satellite nodes 300-1 . . . 300-12 displayed in the perspective 141-1. Selection of a node in the view shown in FIG. 5 causes the display manager 120 to update the viewed portion of the semantic network.

Figure 6:
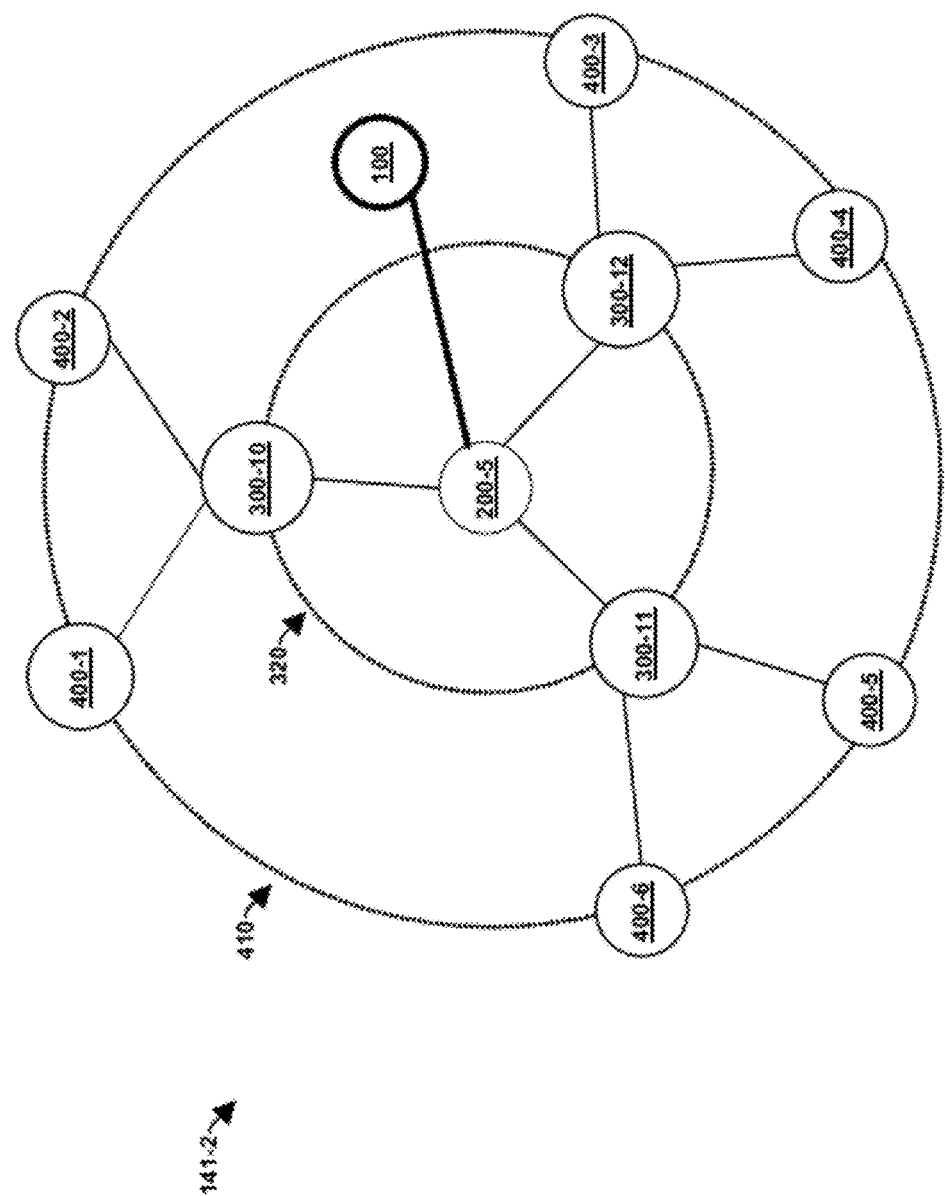
FIG. 6 is an example diagram of an updated radial perspective of a navigable semantic network rendered by a display manager according to embodiments herein.

Referring now to FIG. 6, FIG. 6 is an example diagram of an updated radial perspective 141-2 of a navigable semantic network 141 rendered by a display manager 120 according to embodiments herein. It is understood that FIG. 3 illustrates an updated radial perspective 141-2 rendered in response to a user selecting a particular node 200-5 displayed in a the radial perspective 141-1 of FIG. 2. In one embodiment, user selection of the particular node 200-5 is sensed by the node selection detector 120-3 when the user clicks on the node 200-5 with a computer mouse 116 as it is displayed in the radial perspective 141-1.

By selecting the user-selected node 200-5 (in FIG. 5), the user navigates down a hierarchical level in the semantic network. For example, in response to navigation input such as selection of node 200-5, the display manager 120 renders the updated radial perspective 141-2 to display relationships between the user-selected node 200-5 and nodes that are proximately related with the user-selected node 200-5 in the semantic network. Node 200-5 can be displayed as a focal node in lieu of node 100. Thus, the display manager 120 changes which portion of the semantic network will be represented in the updated radial perspective 141-2 based on user input.

Specifically, the updated radial perspective 141-2 situates the user-selected node 200-5 at or around the center of the updated radial perspective 141-2. A visually distinct graphical branch emanates outward from the user-selected node 200-5 to the node 100 that was centered in the previously-rendered radial perspective 141-1.

The visually distinct graphical branch between node 200-5 and node 100 represent a hierarchical relationship, as defined by the semantic network model 150. In particular, the visually distinct graphical branch indicates that the user-selected node 200-5, although centered in the updated radial perspective 141-2, is hierarchically subordinate to the node 100 that was centered in the previously-rendered perspective 141-1. Links between node 200-5 and each of node 300-10, node 300-11, and node 300-12 are displayed in a different manner than the link between node 200-5 and node 100 to indicate that the nodes 300-10, 300-11, and 300-12 are subordinate or lower in a hierarchy than node 200-5.

Since the display manager 120 renders the updated radial perspective 141-1 to display direct and indirect node relationships that the user-selected node 200-5 has with other nodes in the semantic network, the updated radial perspective 141-1 includes the additional satellite nodes 300-10 . . . 300-12 from the previously-rendered perspective 141-1. However, rather than orbiting the node 100 that was the centered node (i.e. the centroid) in the previously-rendered radial perspective 141-1, the additional satellite nodes 300-10 . . . 300-12 orbit the user-selected node 200-5 along a new substantially concentric or elliptical path 320 in the updated radial perspective 141-2. Thus, nodes 300-1 . . . 300-9 become hidden as shown in radial perspective 141-2.

Further, the updated radial perspective 141-2 includes outer-satellite nodes 400-1, 400-2, 400-3, 400-4, 400-5, 400-6 that have a relationship with the additional satellite nodes 300-10 . . . 300-12. Visually distinct graphical branches emanate outward from the additional satellite nodes 300-10 . . . 300-12 to the outer-satellite nodes 400-1 . . . 400-6. The visually distinct graphical branches that connect the additional satellite nodes 300-10 . . . 300-12 with the outer-satellite nodes 400-1 . . . 400-6 represent node relationships amongst the nodes 300-10 . . . 300-12, 400-1 . . . 400-6 as defined in a semantic network model 150. In addition, the display manager 120 displays the outer-satellite nodes 400-1 . . . 400-6 as orbiting around the user-selected node 200-5 along a substantially concentric path 410

To further navigate down another hierarchical level in the semantic network, the user can select (e.g. click on) any of the additional satellite nodes 300-10 . . . 300-12 and outer-satellite nodes 400-1 . . . 400-6 displayed in the updated radial perspective 141-2.

Figure 7:
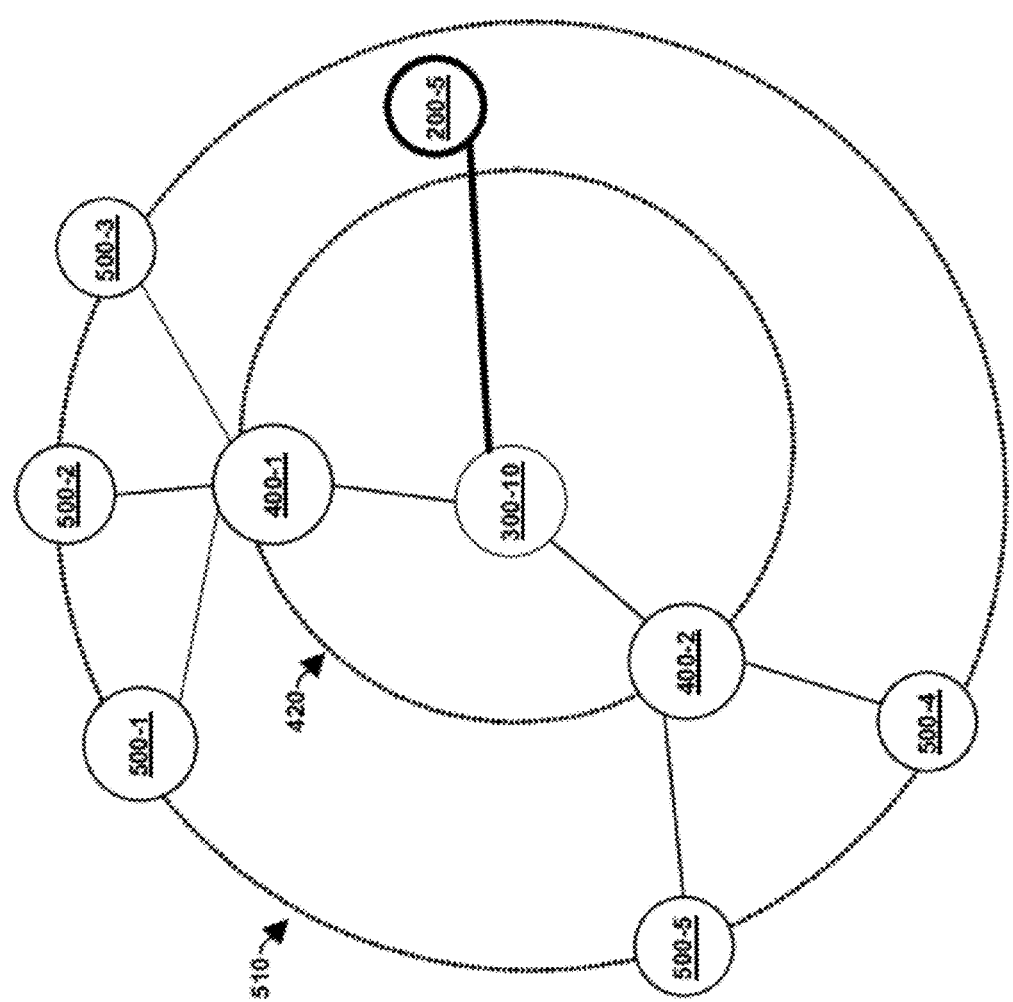
FIG. 7 is an example diagram of a updated radial perspective of a navigable semantic network rendered by a display manager according to embodiments herein.

FIG. 7 is an example diagram of an updated radial perspective 141-3 of a navigable semantic network 141 rendered by a display manager 120 according to embodiments herein. It is understood that FIG. 4 illustrates an updated radial perspective 141-3 rendered in response to a user selecting a particular node 300-10 displayed in the radial perspective 141-2 of FIG. 3.

By selecting the node 300-10, the user navigates down yet another hierarchical level in the semantic network. To accurately reflect the user's navigation to a new portion of the semantic network, the display manager 120 renders the updated radial perspective 141-3 to display relationships between the user-selected node 300-10 and nodes in the new portion of the semantic network that are proximately related with the user-selected node 300-10.

Specifically, the updated radial perspective 141-3 situates the user-selected node 300-10 at the center or origin position of the updated radial perspective 141-3. A visually distinct graphical branch emanates outward from the user-selected node 300-10 to the node 200-5 that was centered in a previously-rendered updated radial perspective 141-2.

The visually distinct graphical branch between the two nodes 300-10, 200-5 represents a hierarchical relationship, as defined by the semantic network model 150. In particular, the visually distinct graphical branch indicates that the user-selected node 300-10, although an origin in the updated radial perspective 141-3, is hierarchically subordinate to the node 200-5 that was centered in the previously-rendered updated radial perspective 141-2. In other words, node 200-5 can represent a manager of an employee that is represented by node 300-10. Similarly, node 400-1 can represent an employee that reports to the employee represented by node 300-10.

Displaying different levels branches or links in different ways to indicate a relative position in a hierarchy enables the user to more easily navigate the semantic network because the user can identify which nodes to select to navigate higher in the network in a subsequent view versus which nodes can be selected to view nodes lower in the hierarchy.

Since the display manager 120 renders the updated radial perspective 141-3 to display direct and indirect node relationships the user-selected node 300-10 has with other nodes in the semantic network, the updated radial perspective 141-3 includes the outer-satellite nodes 400-1, 400-2 from the previously-rendered updated radial perspective 141-2 that are related with the user-selected node 300-10. However, rather than orbiting the node 200-5 that was centered in the previously-rendered updated radial perspective 141-2, the outer-satellite nodes 400-1, 400-2 orbit the user-selected node 300-10 along a new substantially concentric path 420.

Note that the updated radial perspective 141-3 also includes more remote-satellite nodes 500-1, 500-2, 500-3, 500-4, 500-5 that are related to the outer-satellite nodes 400-1, 400-2. Visually distinct graphical branches emanate outward from the outer-satellite nodes 400-1, 400-2 to the remote-satellite nodes 500-1 . . . 500-5. The visually distinct graphical branches that connect the outer-satellite nodes 400-1, 400-2 with the remote-satellite nodes 500-1 . . . 500-5 represent node relationships amongst the nodes 400-1, 400-2, 500-1 . . . 500-5 as defined in a semantic network model 150. In one embodiment, the display manager 120 displays the remote-satellite nodes 500-1 . . . 500-5 as orbiting around the user-selected node 300-10 along a substantially concentric or elliptical path 510. Such a pattern may be more pleasing to certain users.

It is understood that use of the words "outer-satellite nodes" and "remote-satellite nodes", as used in the preceding discussion, is not intended to convey that such nodes have a limited relationship with other nodes. Rather, such terms are employed to merely distinguish groups of nodes in order to describe different possible ways of displaying nodes.

Figure 8:
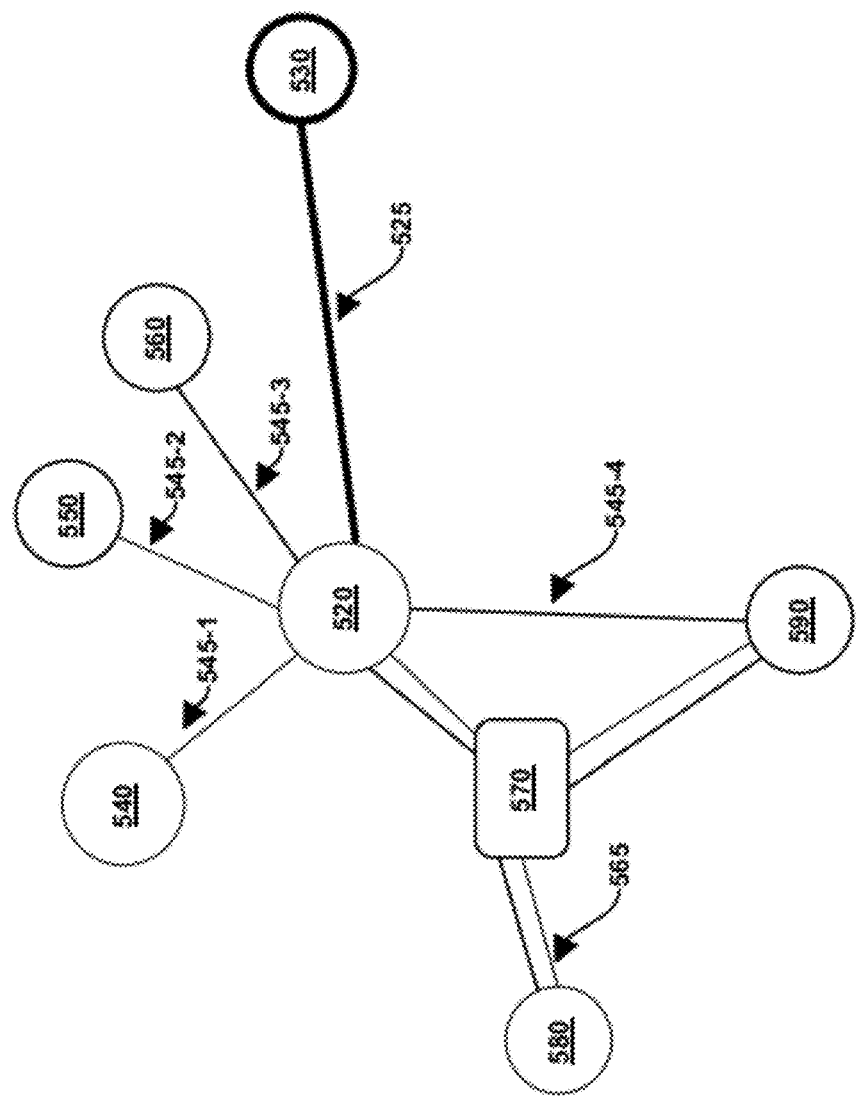
FIG. 8 is an example diagram of a radial perspective for an expertise system that is rendered by a display manager according to embodiments herein.

FIG. 8 is an example diagram of a radial perspective 141-4 for an expertise system as rendered by a display manager 120 according to embodiments herein.

The radial perspective 141-4 provides the user with a graph of nodes that are directly and indirectly related with a centroid 520 (i.e. a center node). The related nodes are arranged around the centroid 520. For example, in one embodiment, nodes of a common type (e.g. employee nodes) can be arranged in a concentric manner around the centroid 520, or another node 570 that orbits the centroid 520. Where the nodes displayed in the radial perspective 141-4 are obtained from a semantic network for an expertise system, the user can be provided with context (e.g., relationship information) as to those resources (i.e. employees, products, projects, companies, interests and skills) in the expertise system that are proximately, directly related and proximately, indirectly related with the centroid 520.

It is understood that the display manager 120 utilizes a first edge node declaration, described by the edge declaration 120-4 as retrieved from the semantic network model 150. The first edge node declaration can be associated with the centroid 520 to identify which portion (e.g., nodes and branches) of the semantic network to display in the radial perspective 141-4. Thus, the radial perspective 141-4 does not include all the nodes in the semantic network.

To render the radial perspective 141-4, the display manager 120 creates a first network of nodes based on hierarchical employee relationships as defined by the semantic network model 150. In one embodiment, the display manager 120 displays the first network in the radial perspective 141-4 to include employee nodes 520, 530, 540, 550, 560, 590. Such nodes can be displayed in a substantially concentrically aligned pattern around the node 520.

A visually distinct graphical branch 525 emanates outward from the centroid 520 to a node 530 that represents a supervisory employee. Hence, the graphical branch 525 between the two nodes 520, 530 indicates that the employee represented by the centroid 520 is subordinate to the employee represented by the connected node 530.

However, additional graphical branches 545-1, 545-2, 545-3, 545-4 emanate outward from the centroid 520 to other employee nodes 540, 550, 560, 590. The graphical branches 545-1, 545-2, 545-3, 545-4 that link the nodes 520, 540, 550, 560, 590 are also visually distinct (with respect to branch 525) in order to indicate that the employees represented by the other employee nodes 540, 550, 560, 590 are subordinate to the employee represented by the centroid 520.

The display manager 120 also creates a second network of nodes based on a domain relationship as defined by the semantic network model 150. The second network of nodes in the radial perspective 141-4 includes employee nodes 520, 580, 590 and a project node 570 that functions as the root of the second network.

Hence, the second network of nodes represents that the employees represented by the employee nodes 520, 580, 590 are involved in the same project or work together. However, the employee nodes 580, 590 both can be concentrically arranged around the centroid 520 and the project node 570, while the project node 570 proximately orbits is at least shown as being related to node 520 (e.g., an origin node, centroid node, focal node, etc.) in the radial perspective 141-4.

Visually distinct graphical branches (such as a double-lined branch 565) emanate outward from the project node 570 to the "project member" nodes 520, 580, 590. The graphical branches to the "project member" nodes 520, 580, 590 thereby indicate a relationship amongst the "project member" nodes 520, 580, 590 based on a shared domain (i.e. a shared project) instead of a hierarchy.

Additionally, the radial perspective 141-4 provides the user with an indication that various nodes, such as the centroid 520 and a particular project member 590, are related according to a proximate, direct hierarchical relationship as well as via a common domain (i.e. the same project).

Further, the visually distinct graphical branch that emanates from the project node 570 to the centroid 520 acts as a bridge between the first network and the second network. By connecting both networks, the display manager 120 provides a visualization of contextual relationships between the nodes of both node networks even though some nodes (such as nodes 550, 580) have no hierarchical or domain-based relationship with respect to each other. In other words, a first network of nodes in view 141-4 can indicate hierarchical information with respect to the nodes displayed therein, whereas another network of one or mode simultaneously displayed nodes in view 141-4 may not indicate a hierarchy.

Thus, in contrast with conventional systems, the display manager 120 provides the user with a simultaneous view (i.e. the radial perspective 141-4) of hierarchical node relationships in the first network and domain-based node relationships in the second network. By displaying the radial perspective 141-4 as a combination of both networks, the display manager 120 visualizes contextual relationships between nodes even though the nodes do not share a direct linkage in the semantic network. The display manager thereby offers the user with an ability to navigate through the semantic network by selecting nodes based on their contextual relationships with other nodes. For example, node 580 has an indirect relationship with node 520. The user can select any node in the view to navigate to a new perspective. Assume in this example that the user selects (e.g., clicks on) node 540. The display manager 120 updates the graphical user interface 140 as shown in FIG. 8.

Figure 9:
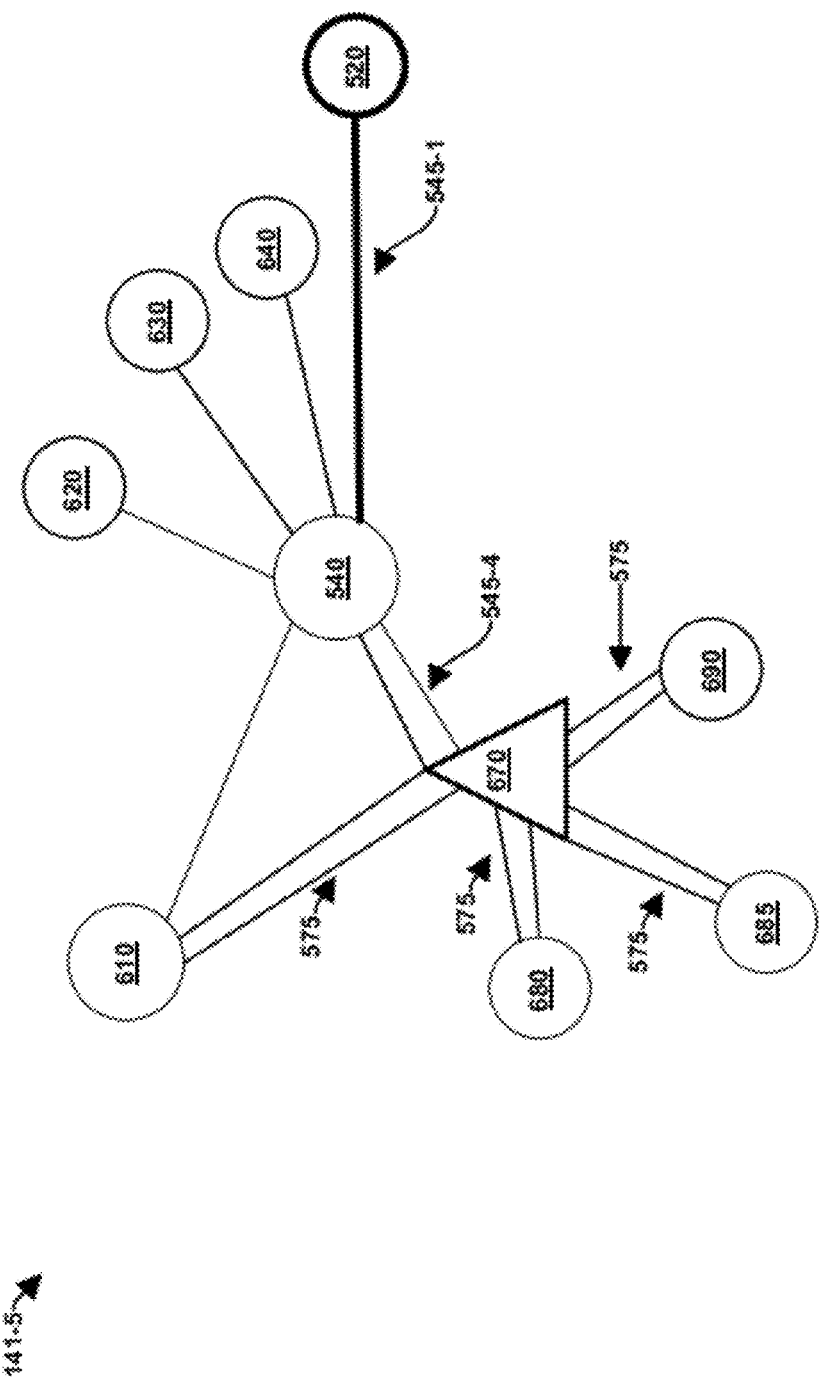
FIG. 9 is an example diagram of an updated radial perspective for an expertise system that is rendered by a display manager according to embodiments herein.

FIG. 9 is an example diagram of an updated radial perspective 141-5 for an expertise system that is rendered by a display manager 120 according to embodiments herein.

As indicated, FIG. 9 illustrates an updated radial perspective 141-5 rendered in response to a user selecting a particular node 540 displayed in a previously-rendered radial perspective 141-4.

By selecting the user-selected node 540, and because node 540 represents a resource node subordinate to node 520, clicking on node 540 results in the user navigating down a hierarchical level in the semantic network. To accurately reflect the user's navigation, the display manager 120 renders the radial perspective 141-5 to display relationships between the user-selected node 540 and nodes in the semantic network that are proximately or closely related (e.g., directly or indirectly) with the user-selected node 540, which is an origin node 540. In response to the selection, display manager 120 displays the node 540 as an origin node in the updated radial perspective 141-5.

To render the updated radial perspective 141-5, the display manager 120 creates a first network of nodes based on hierarchical employee relationships, as defined by a semantic network model 150 for the semantic network of the expertise system. In the present example, the first network of nodes in the updated radial perspective 141-5 includes employee nodes 610, 620, 630, 640 arranged in a concentric manner around the node 540 (e.g., the new origin node).

A visually distinct graphical branch 545 emanates outward from the centroid 540 to node 520. The graphical branch 545 between the two nodes 540, 520 indicates that the employee represented by the origin node 540 is subordinate to the employee represented by the node 520. In other words, the display manager 120 provides an indication that the node 520 is higher in a hierarchy than node 540 (while still displaying the radial links from an origin node to other related nodes).

Additional graphical branches emanate outward from the centroid 540 to other employee nodes 610, 620, 630, 640. The graphical branches to the nodes 610, 620, 630, 640 are also visually distinct in order to indicate that the employees represented by the other employee nodes 610, 620, 630, 640 are subordinate to the employee represented by the node 540.

The display manager 120 also creates a second network of nodes based on a domain relationship as defined by the semantic network model 150 for the semantic network of the expertise system. The second network of nodes in the updated radial perspective 141-5 includes employee nodes 610, 680, 685, 690 and area-of-interest node 670 that functions as the root of the second network.

In the context of the present example, the second network of nodes indicates that the employees represented by the employee nodes 610, 680, 685, 690 are interested in the subject matter represented by the interest node 670. In one embodiment, employee nodes 680, 685, 690 are substantially concentrically aligned around the centroid 540, while the interest node 670 proximately orbits the centroid 540.

Visually distinct graphical branches (such as a double-lined branch 575) emanate outward from the interest node 670 to employee nodes 610, 680, 685, 690. The graphical branches to the "interested" employee nodes 610, 680, 685, and 690 that share the same area-of-interest (as identified by node 670).

Additionally, the updated radial perspective 141-5 provides the user with an indication that various nodes, such as the centroid 540 and an "interested" employee (e.g., node 610), are related according to a proximate, direct hierarchical relationship and share the same area-of-interest. Accordingly, a user can quickly identify a relationship amongst multiple employee resources as well as identify which of the employee resources share the same area-of-interest.

Further, the visually distinct graphical branch that emanates from the interest node 670 to the centroid 540 acts as a bridge between the first network (e.g., satellite nodes displayed around node 540) and the second network (e.g., satellite nodes displayed around node 670). By connecting both node networks, the display manager 120 represents a contextual relationship between the nodes of both networks even though some nodes (such as nodes 630, 685) have no hierarchical or domain-based relationship.

As previously discussed, the display manager 120 allows the user to navigate the semantic network across domains in addition the to hierarchical navigation described above. Thus, if the user selects the interest node 670, the display manager 120 will render a radial perspective with the interest node 670 as a centroid. Visually distinct branches will emanate from the centered interest node 670 to various employee, project, interest, product, expertise, and company nodes to represent relationships between those nodes and the centered interest node 670.

Assume that the user navigating the semantic network decides to remove a network of nodes (e.g., nodes 620, 630, 640, 650, and 520) from being displayed in the respective view but continue to display at least one network of other nodes. These nodes (e.g., nodes 620, 630, 640, 650, and 520) may be distracting to a user who really only wants to view satellite nodes associated with node 670. To hide these satellite nodes, the user can provide "zoom-in" navigation input. Such input can be received by the user clicking on a selection from a pull-down menu to remove any satellite nodes associated with 540 that display of not have a direct, "single-link" relationship with node 670. In response to receiving the filter input (e.g., zoom in command) provided by a respective user, the display manager 120 renders the view as shown in FIG. 10.

Figure 10:
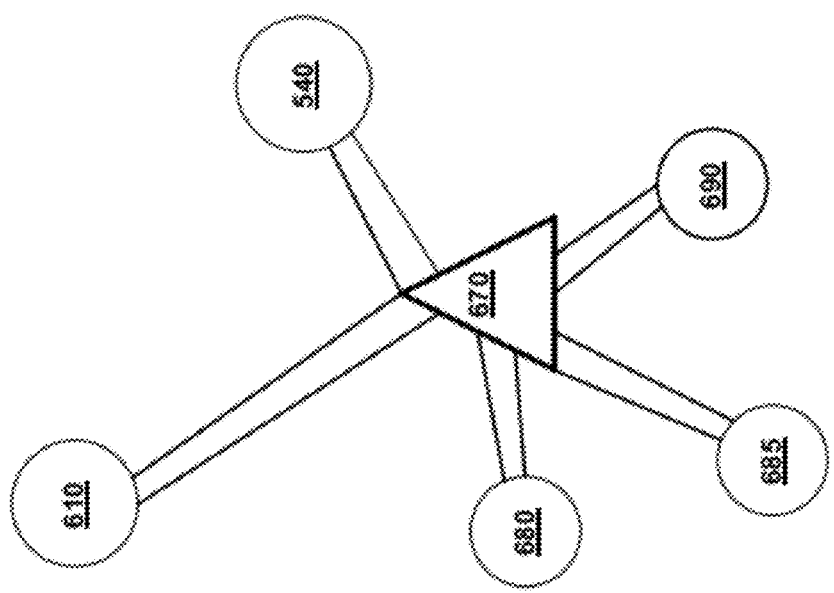
FIG. 10 is an example diagram of a filtered radial perspective for an expertise system that is rendered by a display manager according to embodiments herein.

FIG. 10 is an example diagram of a filtered radial perspective 141-6 for an expertise system as rendered by a display manager 120 according to embodiments herein.

Thus, since the filtered radial perspective 141-6 mutes display of the hierarchical node relationships presented in the updated radial perspective's 141-5 first network of nodes, the user only sees employees (as represented by employee nodes 610, 680, 685, 690, 540) that share a common interest, as represented by the interest node 670.

Figure 11:
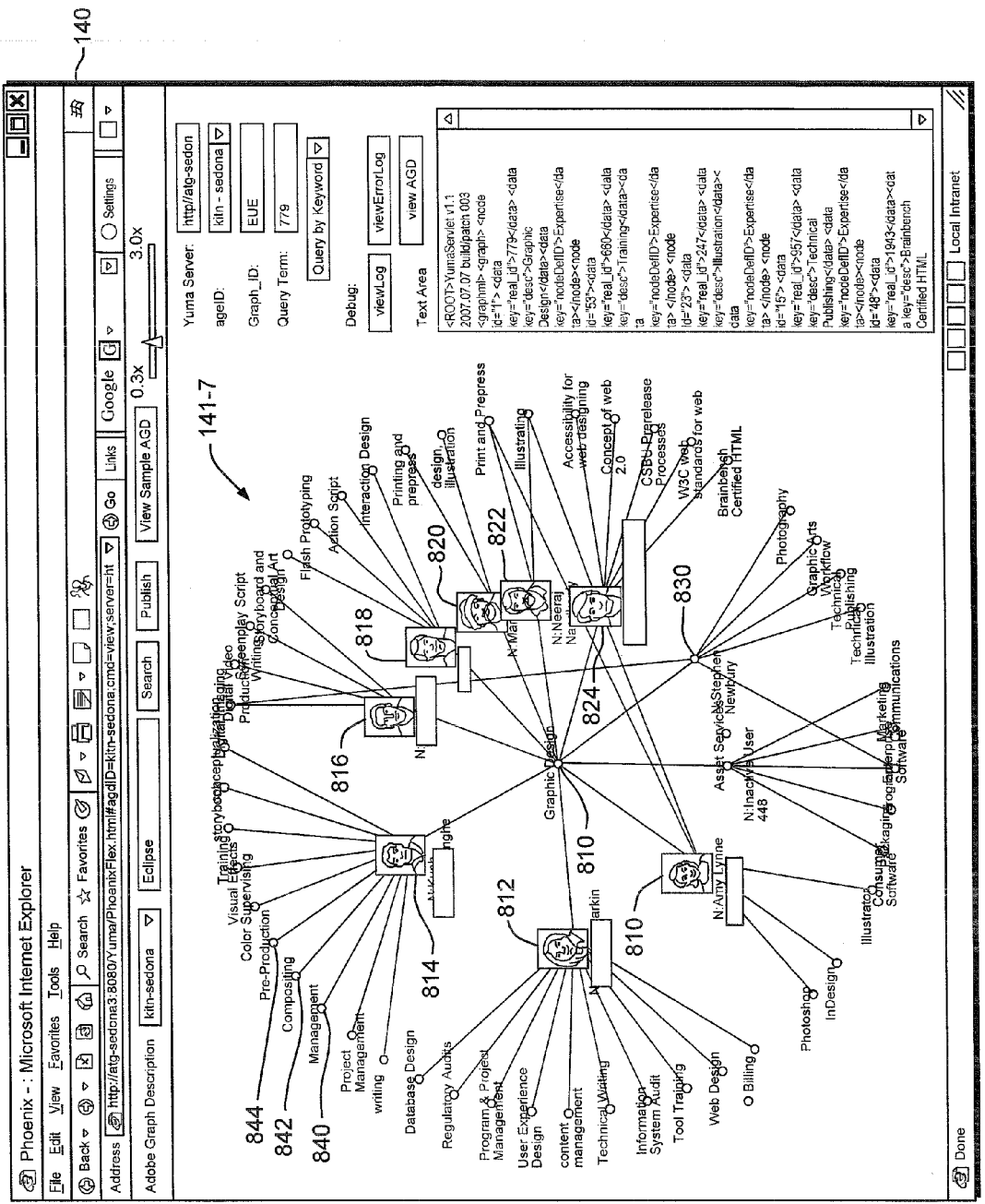
FIG. 11 is an example diagram of an interactive graphical user interface displaying a radial perspective rendered by a display manager according to embodiments herein.

FIG. 11 is an example diagram of an interactive graphical user interface 140 displaying a radial perspective 141-7 rendered by a display manager 120 according to embodiments herein.

Specifically, the radial perspective 141-7 provides a simultaneous presentation of employee nodes, project nodes, product nodes, company nodes, expertise nodes, and interest nodes that are directly and indirectly associated with each other, and in particular, with a node representing an expertise area of graphic design.

In the context of the present example, node 810 of the radial perspective 141-7 represents an area-of-expertise such as graphic design. Visually distinct graphical branches (such as blue graphical branches) emanate outward from the node 810 to employee nodes 812, 814, 816, 818, 820, 822, 824, 830, which represent employees in an organization that are proficient in graphic design.

In one embodiment, the employee nodes 812, 814, 816, 818, 820, 822, 824, 830 can be presented in the radial perspective 141-7 along a substantially concentric path around the centroid 810. Satellite nodes can be displayed in accordance with other patterns as well such as elliptical patterns, random patterns, etc.

Visually distinct branches also emanate from each of employee nodes 812, 814, 816, 818, 820, 822, 824. For example, branches emanate from an employee node 814 to multiple domain nodes 840, 842, 844. Each of the domain nodes 840, 842, 844 represent a project, product, company, expertise, or interest associated with the employee represented by the particular employee node 814. In one embodiment, the so-called domain nodes 840, 842, 844 (and the like) are also presented in the radial perspective 141-7 along a substantially concentric path around the origin node 810.

By viewing the radial perspective 141-7, the user can simultaneously discern all the various projects, products, companies, expertise, and interests associated with employees who are proficient in graphic design. Thus, if the user is searching for a graphic designer that is suitable for a particular task, the user can use the radial perspective 141-7 to obtain contextual information as to each graphical designer's secondary skills and work experiences in relation to the other graphical designers.

In addition, while presenting the radial perspective 141-7, the display manager 120 allows the user to select a particular employee node 820 to access documents of work samples from a repository 180.

Figure 12:
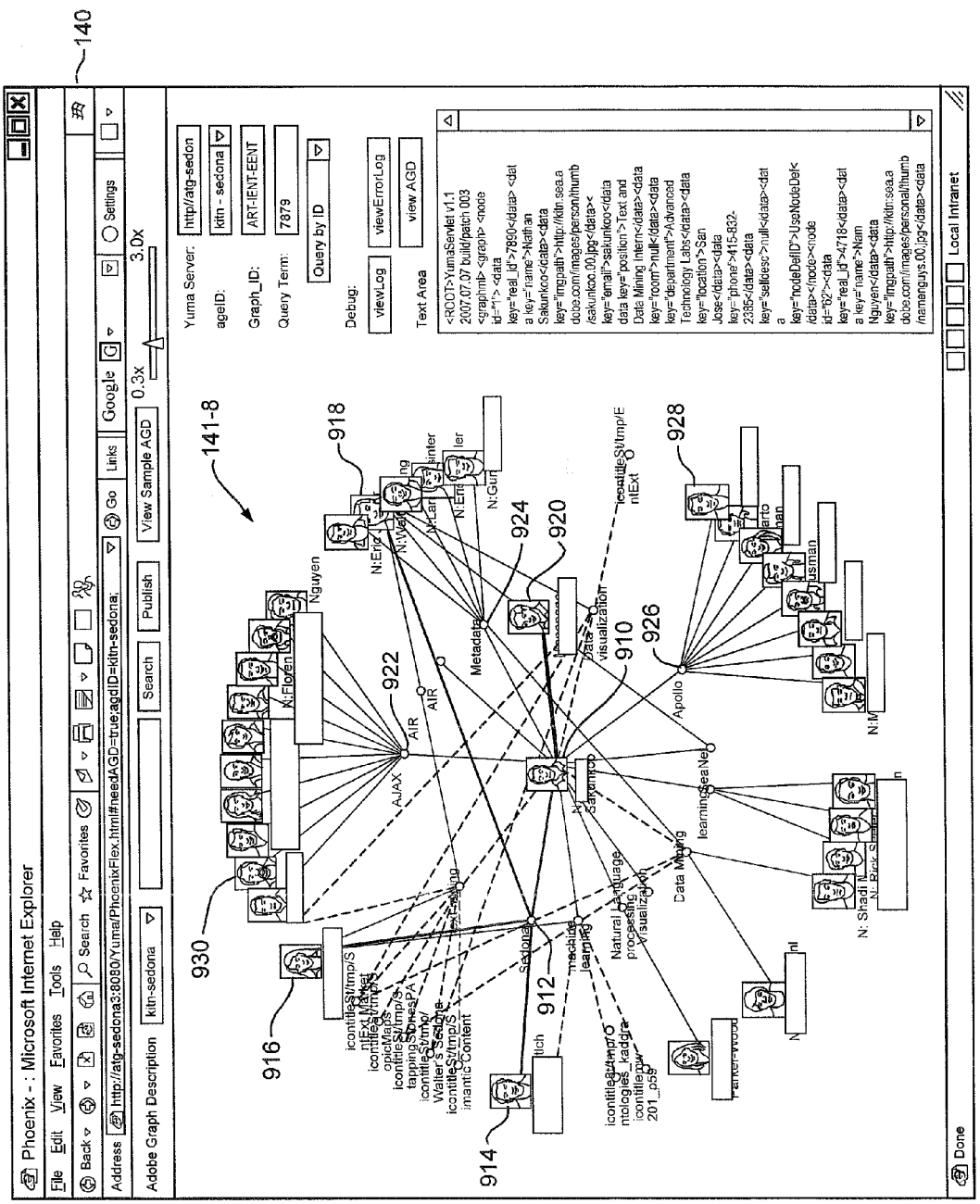
FIG. 12 is an example diagram of an interactive graphical user interface displaying a radial perspective rendered by a display manager according to embodiments herein.

FIG. 12 is an example diagram of an interactive graphical user interface 140 displaying a radial perspective 141-8 rendered by a display manager 120 according to embodiments herein.

The centroid 910 of the radial perspective 141-7 represents a particular employee in an organization. A visually distinct graphical branch (such as a red graphical branch) emanates outward from the centroid 910 to represent a hierarchical relationship where the centroid 910 is subordinate to the employee represented by an employee node 920.

Another visually distinct graphical branch (such as a green graphical branch) emanates outward from the centroid 910 to a project node 912 representing a project group. Similarly, visually distinct graphical branches can also emanate from the project node 912 to other employee nodes 914, 916, 918 that represent employees involved in the project. It is noted that the employee nodes 914, 916, 918 can be presented in the radial perspective 141-8 along a substantially concentric path around the centroid 910.

Other visually distinct branches emanate from the centroid to 910 to nodes 922, 924, 926 that each represent a project, product, company, expertise or an interest associated with the employee represented by the centroid 910. A product node 922 can be connected to an employee node 930 that represents another employee associated with the product. An interest node 924 can be connected to an employee node 918 that represents another employee who has that interest. A project node 926 can be connected to an employee node 928 that represents another employee involved in the project.

Thus, by viewing the radial perspective 141-8, a user can learn that an employee, while having no direct or hierarchical relationship with the employee represented by the centroid 910, shares multiple common domain attributes. For example, the employee represented by a particular employee node 918 is associated with the same interest node 924 and the same project node 912 as the employee represented by the centroid 910.

Note that the display manager 120 can modify the views to appear as shown in FIGS. 11 and 12 depending navigation input. For example, a user can select an area-of-expertise such as graphic design. In response to this selection, the display manager generates a view of the semantic network as shown in FIG. 11 in which an origin node represents the graphic design area-of-expertise. The display manager 120 displays a first ring of employees (e.g., around the origin node 810) that share the area-of-expertise as represented by origin node 810 of FIG. 11. The second ring of nodes (a next level out from the first ring) represents additional areas-of-expertise associated with the employees in the first ring. The use can easily identify which persons share the same area-of-expertise (i.e., graphic design) as well as other areas-of-expertise associated with the employees in the first ring.

In response to selection of an employee in the first ring, the display manager 120 initiates display of the selected employee as an origin node in a similar manner as shown in FIG. 12. For example, the display manager 120 sets the selected employee as an origin node and populates the first ring (of nodes) with areas-of-expertise associated with the origin node (e.g., selected employee). The display manager 120 populates the second ring of nodes with employees that share the areas-of-expertise as indicated by the nodes in the first ring.

By changing a respective view of graphical user interface 140 in accordance with navigation input, a user can easily traverse the semantic network to view information and eventually find resources of interest such as employees that are best suited to perform one or more particular tasks.

FIG. 13 through FIG. 19 illustrate various method embodiments associated with the display manager 120 according to embodiments herein. The rectangular elements in flowcharts 1000, 1100, 1300, 1500, 1600 and 1700 denote "processing blocks" and represent computer software instructions or groups of instructions upon a computer readable medium. Additionally, the processing blocks can represent steps performed by hardware such as a computer, digital signal processor circuit, application specific integrated circuit (ASIC), etc.

Flowcharts 1000, 1100, 1300, 1500, 1600 and 1700 do not necessarily depict the syntax of any particular programming language. Rather, flowcharts 1000, 1100, 1300, 1500, 1600 and 1700 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 13:
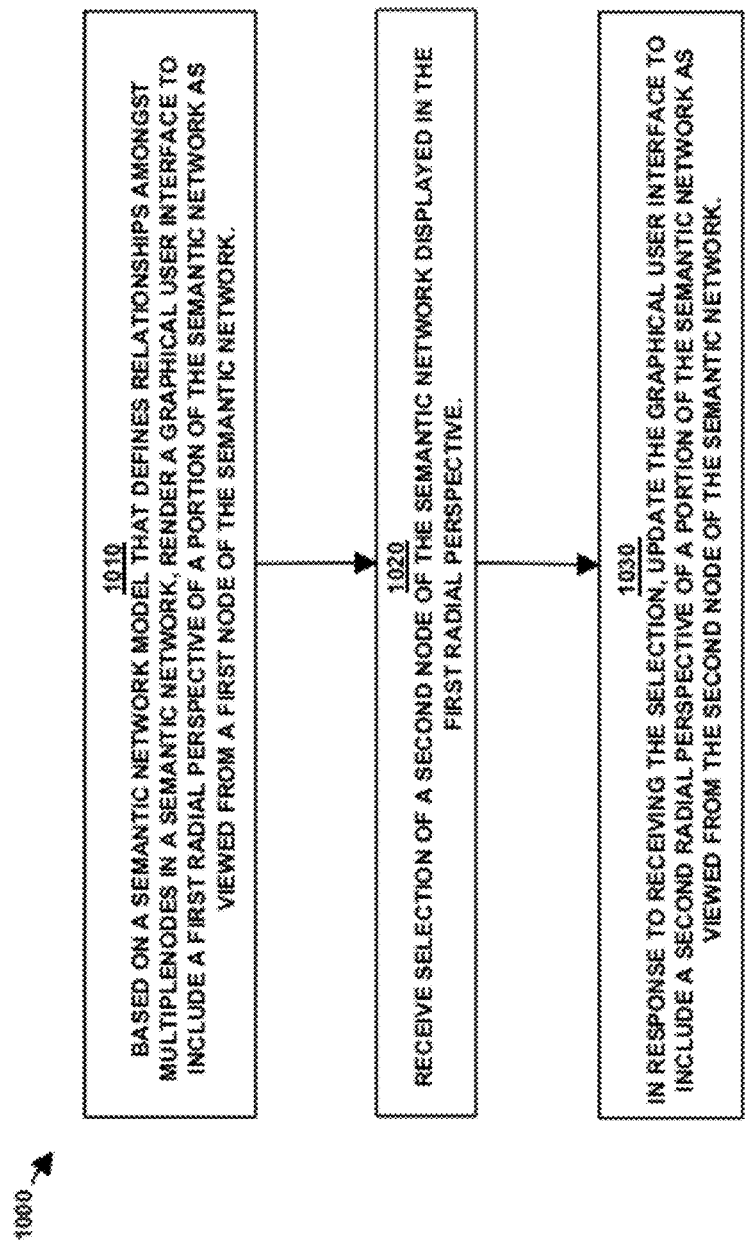
FIG. 13 is an example flowchart of processing steps performed by the display manager to render a graphical user interface with a radial perspective according to embodiments herein.

FIG. 13 is an example flowchart 1000 of processing steps performed by the display manager 120 to render a graphical user interface 140 with a radial perspective 141-4 according to embodiments herein.

Based on a semantic network model 150 that defines relationships amongst multiple nodes in a semantic network, at step 1010, the display manager 120 renders a graphical user interface 140 to include a first radial perspective 141-4 of a portion of the semantic network as viewed from a first node 520 of the semantic network.

At step 1020, the display manager 120 receives selection of a second node 540 of the semantic network displayed in the first radial perspective 141-4.

In response to receiving the selection, at step 1030, the display manager 120 updates the graphical user interface 140 to include a second radial perspective 141-5 of a portion of the semantic network as viewed from the second node 540 of the semantic network.

Figure 14:
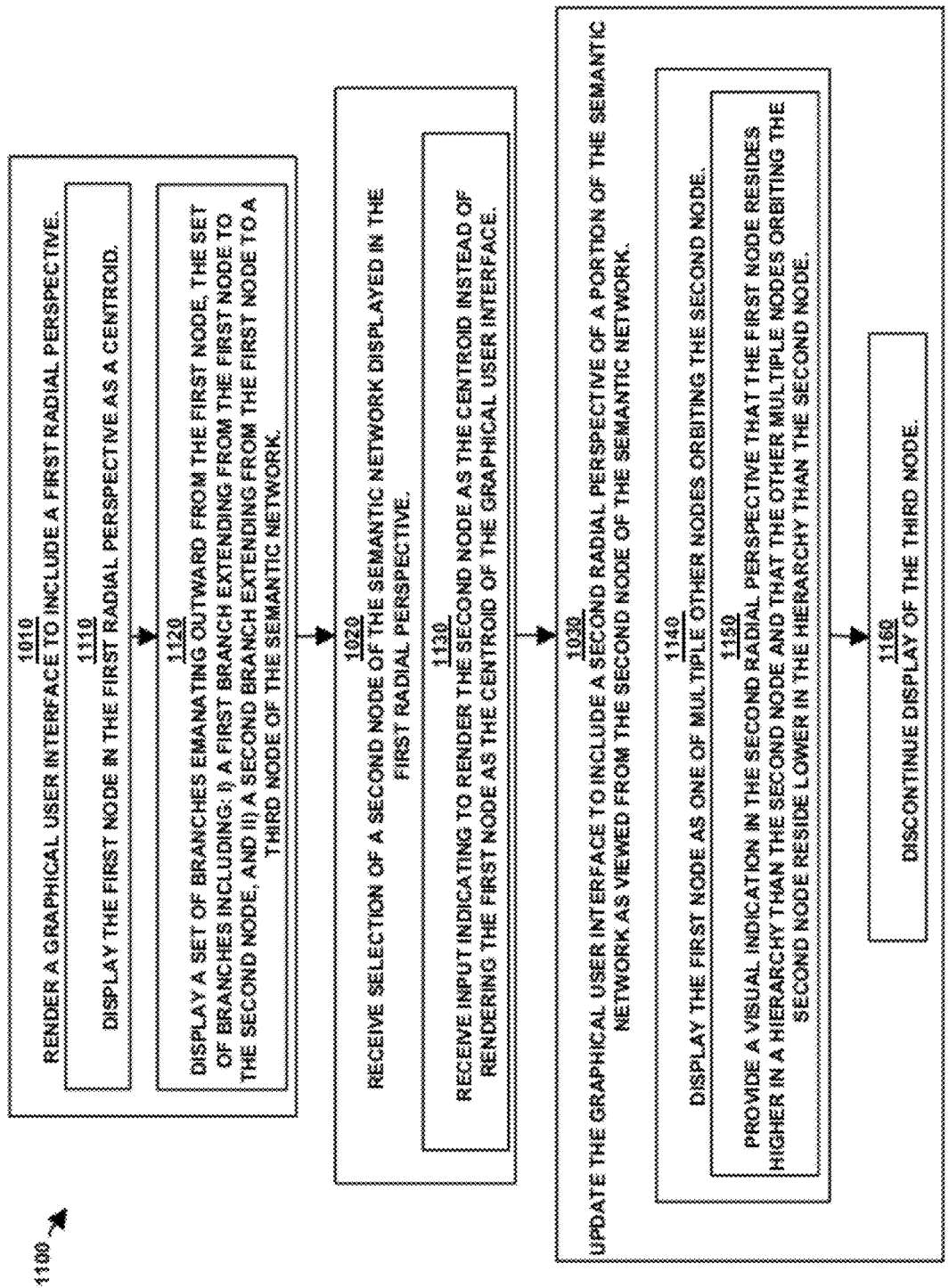
FIG. 14 is an example flowchart of processing steps performed by the display manager to update a radial perspective according to embodiments herein.

FIG. 14 is an example flowchart 1100 of processing steps performed by the display manager 120 to update a radial perspective 141-1 according to embodiments herein.

To render a graphical user interface 140 that includes a first radial perspective 141-1 (as illustrated in FIG. 5), at step 1110, the display manager 120 displays a first node 100 in the first radial perspective 141-1 as a centroid or origin node.

At step 1120, the display manager 120 displays a set of branches emanating outward from the first node 100. The set of branches includes: i) a first branch extending from the first node 100 to a second node 200-5, and ii) a second branch extending from the first node 100 to a third node 200-1 of the semantic network.

Display of the first node, the second node and the third node can include presenting an icon and/or a text box in conjunction with display of the first, second and third node. For example, if a first node represents an employee, an icon representing a likeness of the employee can be displayed proximate to the first node.

At step 1130, the display manager 120 receives input to render the second node 200-5 as the centroid or origin (in a second radial perspective 141-2) instead of rendering the first node 100 as the centroid of the graphical user interface 140.

At step 1140, the display manager 120 displays the first node 100 as one of multiple other nodes orbiting the second node 200-5 in the second radial perspective 141-2.

At step 1150, the display manager 120 provides a visual indication (e.g. thick graphical branch,) in the second radial perspective 141-2 that the first node 100 resides higher in a hierarchy than the second node 200-5 and that the other multiple nodes 300-10 . . . 300-12 orbiting the second node 200-5 reside lower in the hierarchy than the second node 200-5. As previously discussed, this can be done via different colored links between nodes, different highlighting of links between nodes, etc.

At step 1160, the display manager 120 discontinues display of the third node 200-1 so that it is now hidden from view in response to updating the perspective.

It is understood that the display manager 120 renders the graphical user interface 140 to include the second radial perspective 141-2. To do so, the display manager 120 displays a center node 200-5 in the second radial perspective 141-2, and displays a set of branches (i.e. graphical branches) emanating outward from the center node 200-5 to a set of satellite nodes 100, 300-10 . . . 300-12 orbiting the center node 200-5. Thus, in addition to providing a radial view indicating hierarchical relationships, the display manager can continually update a view to include different nodes of interest depending on navigation input provided by a user.

Figure 15:
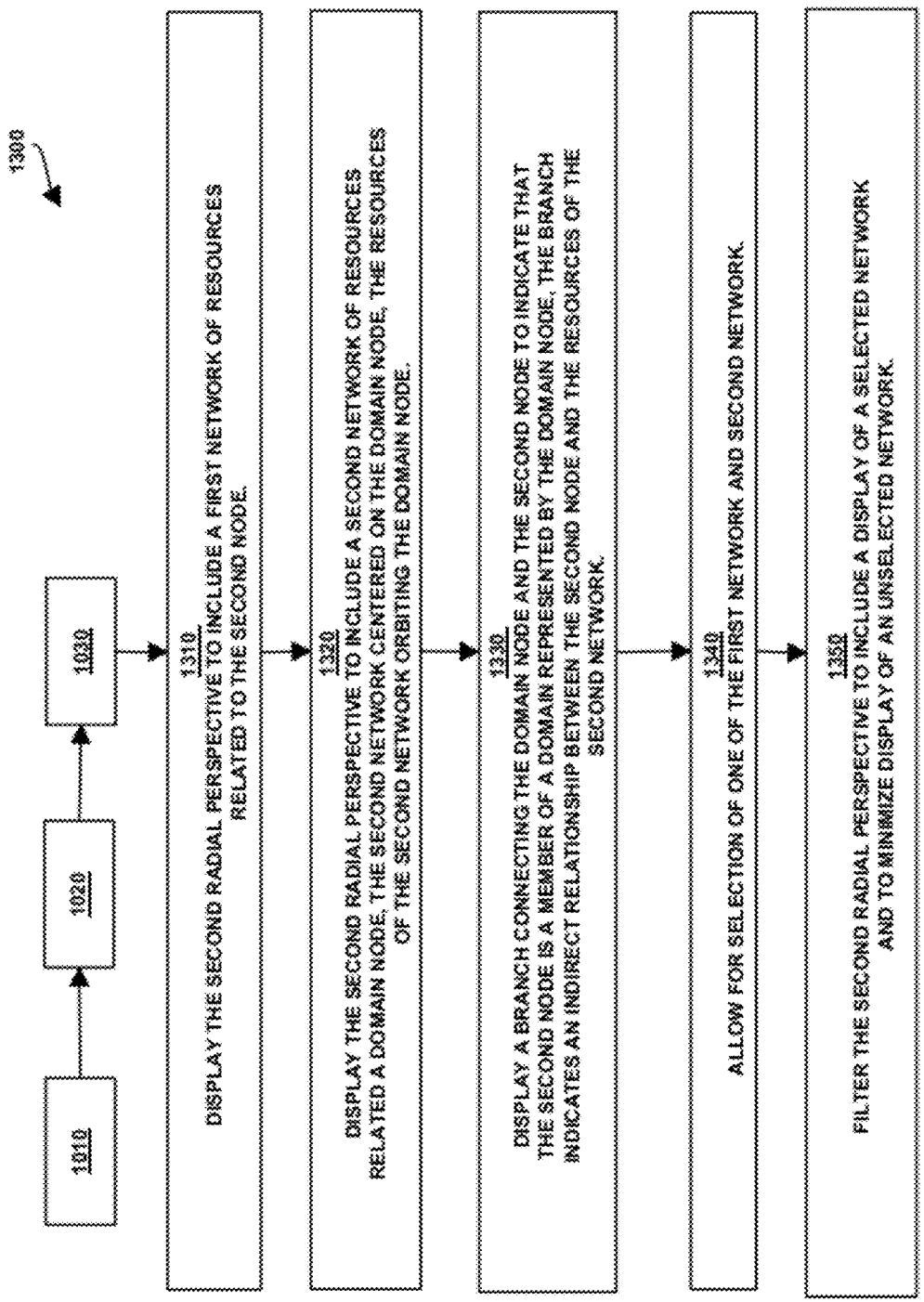
FIG. 15 is an example flowchart of processing steps performed by the display manager to connect a first network and a second network of resources in a radial perspective according to embodiments herein.

FIG. 15 is an example flowchart 1300 of processing steps performed by the display manager 120 to connect a first network and a second network of resources in a radial perspective 141-5 according to embodiments herein.

At step 1310, the display manager 120 displays the second radial perspective 141-5 to include a first network of resources related to the second node 540.

At step 1320, the display manager 120 displays the second radial perspective 141-5 to include a second network of resources related a domain node 670. The second network is centered on the domain node 670 with nodes 610, 680, 685, 690 representing resources of the second network orbiting the domain node 670.

At step 1330, the display manager 120 displays a branch 675 connecting the domain node 670 and the second node 540 to indicate that the second node 540 is a member of a domain represented by the domain node 670. The branch 670 indicates an indirect relationship between the second node 540 and the resources (e.g. nodes 680, 685, 690) of the second network.

At step 1340, the display manager 120 allows for selection of the first network or the second network.

At step 1350, the display manager 120 filters the second radial perspective 141-5 to include a display, via a filtered radial perspective 141-6, of a selected network and to minimize display of an unselected network.

Figure 16:
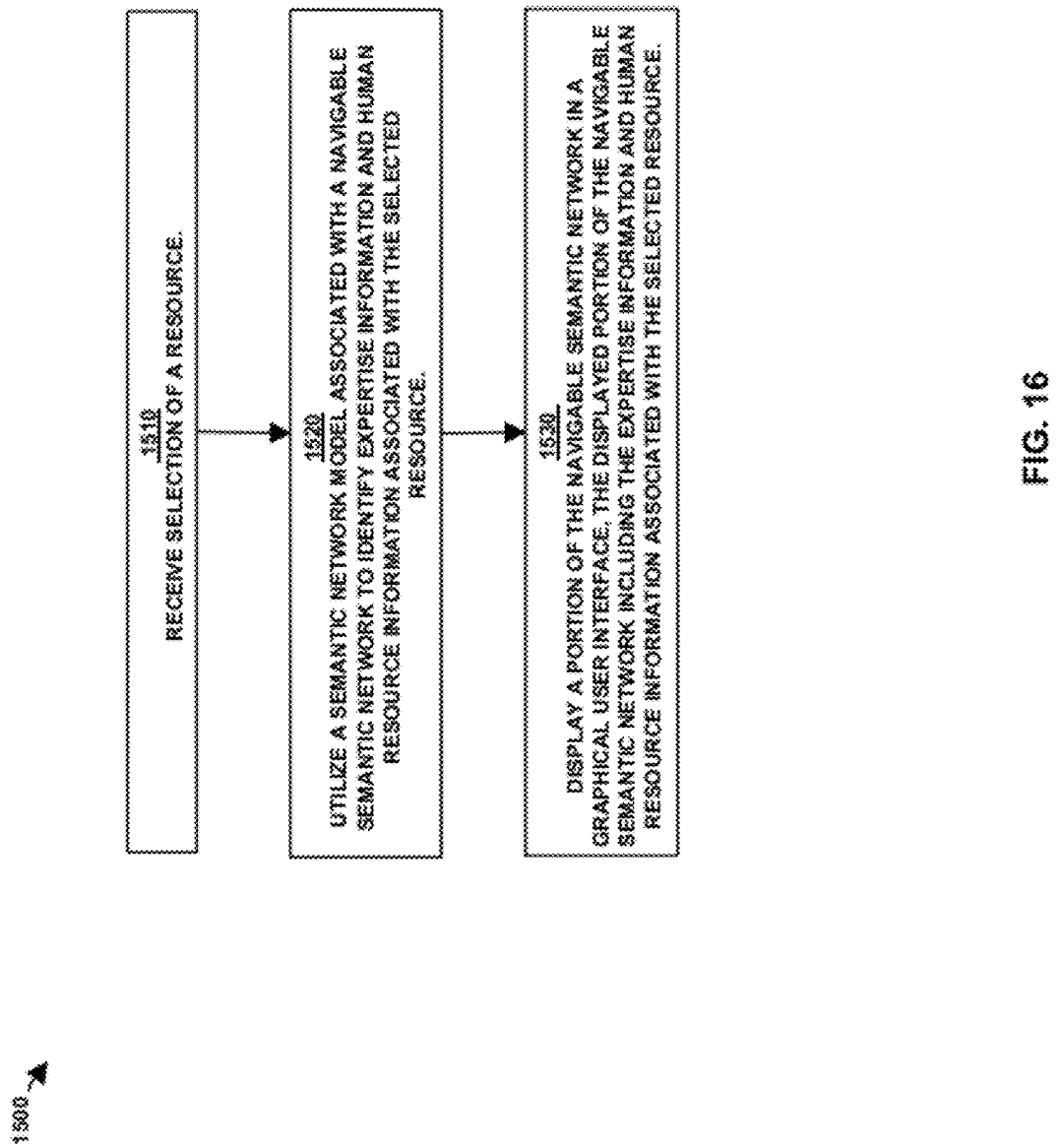
FIG. 16 is an example flowchart of processing steps performed by the display manager to display a portion of a navigable semantic network according to embodiments herein.

FIG. 16 is an example flowchart 1500 of processing steps performed by the display manager 120 to display a portion of a navigable semantic network 141 according to embodiments herein.

At step 1510, the display manager 120 receives selection of a resource 540.

At step 1520, the display manager 120 utilizes a semantic network model 150 associated with a navigable semantic network 141 to identify expertise information and human resource information associated with the selected resource.

At step 1530, the display manager 120 displays a portion of the navigable semantic network in a graphical user interface 140. The displayed portion of the navigable semantic network 141 includes the expertise information and human resource information associated with the selected resource.

Figure 17:
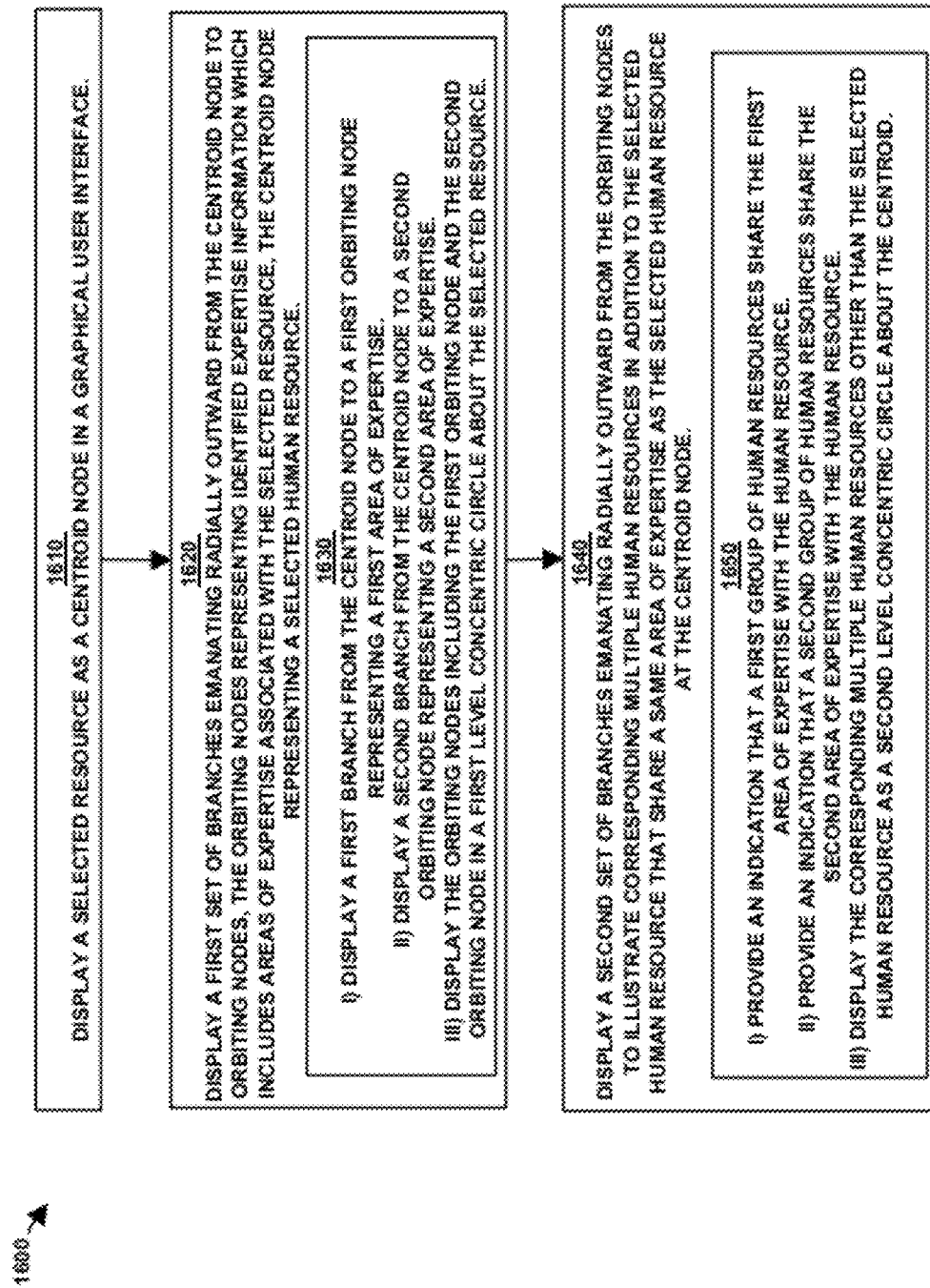
FIGS. 17-18 are example flowcharts of processing steps performed by the display manager to display branches from a focal node to orbiting nodes in a graphical user interface according to embodiments herein.
Figure 18:
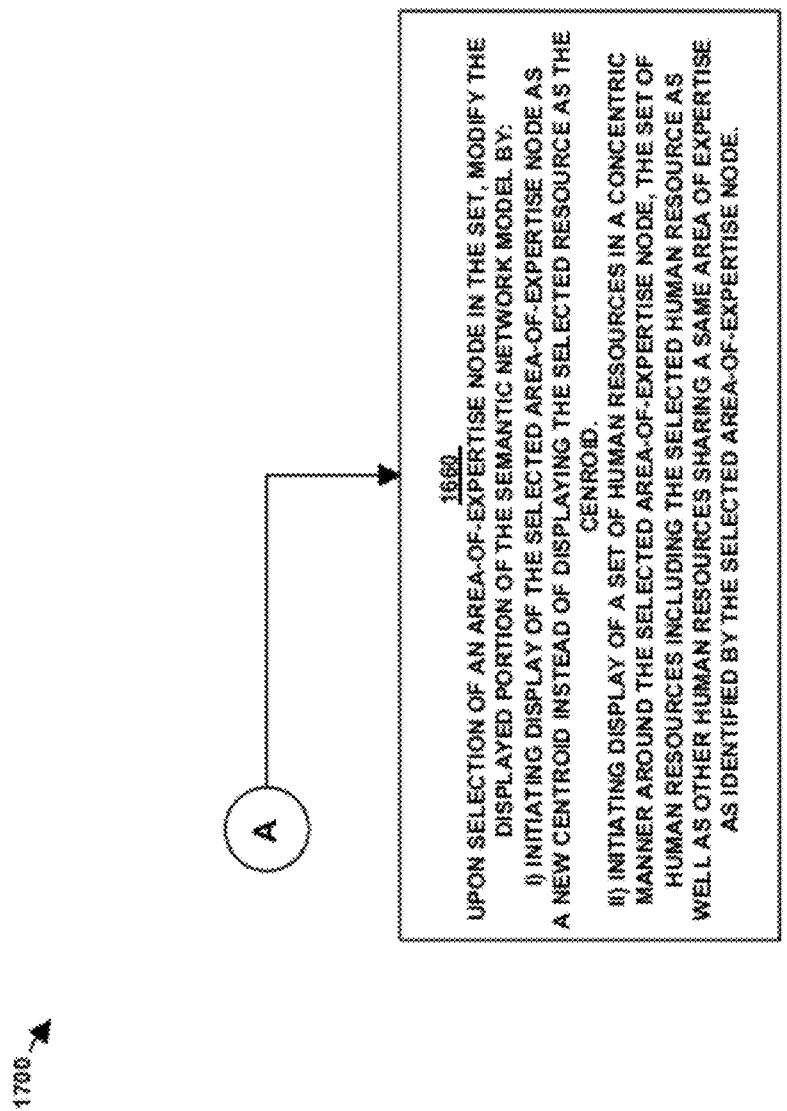

FIGS. 17-18 are example flowcharts 1600, 1700 of processing steps performed by the display manager 120 to display branches from a centroid node to orbiting nodes in a graphical user interface 140 according to embodiments herein.

At step 1610, the display manager 120 displays a selected resource as a centroid node in a graphical user interface 140.

At step 1620, the display manager 120 displays a first set of branches emanating radially outward from the centroid node to orbiting nodes. The orbiting nodes can represent employees associated with the selected resource 540. Assume that the selected resource at the origin represents a human resource.

At step 1630, the display manager 120 displays a first branch from the centroid node to a first orbiting node, which represents a first area of expertise such as a project. The display manager 120 also displays a second branch from the centroid node to a second orbiting node, which represents a second area of expertise, such as skill or subject matter, associated with the origin node. The display manager 120 displays the orbiting nodes in a first level about the selected resource.

At step 1640, the display manager 120 displays a second set of branches emanating radially outward from the orbiting nodes (e.g., expertise nodes) to illustrate corresponding multiple human resources in addition to the selected human resource that share a same area of expertise as the selected human resource. In other words, the first orbit of expertise nodes orbiting the origin represent areas-of-expertise associated with the origin node. Other members in the organization that share the areas-of-expertise are displayed in a second orbit outside of the first orbit.

At step 1650, the display manager 120 provides an indication that a first group of human resources share the first area of expertise with the selected human resource. For example, a given area-of-expertise node has branches emanating radially outward from the area-of-expertise to the origin node as well as other member nodes in an organization that share that area-of-expertise.

Thus, the display manager 120 can provide an indication that a second group of human resources share the second area of expertise with the human resource (e.g., origin node). This is also shown in FIG. 12.

Upon selection of an area-of-expertise node in the set, at step1660, the display manager 120 modifies the displayed portion of the semantic network model by: i) initiating display of the selected area-of-expertise node as a new centroid instead of displaying the selected resource as the centroid.

The display manager 120 can also initiate display of a set of human resources in a concentric manner around the selected area-of-expertise node. The set of human resources include the selected human resource as well as other human resources sharing a same area of expertise as identified by the selected area-of-expertise node.

Figure 19:
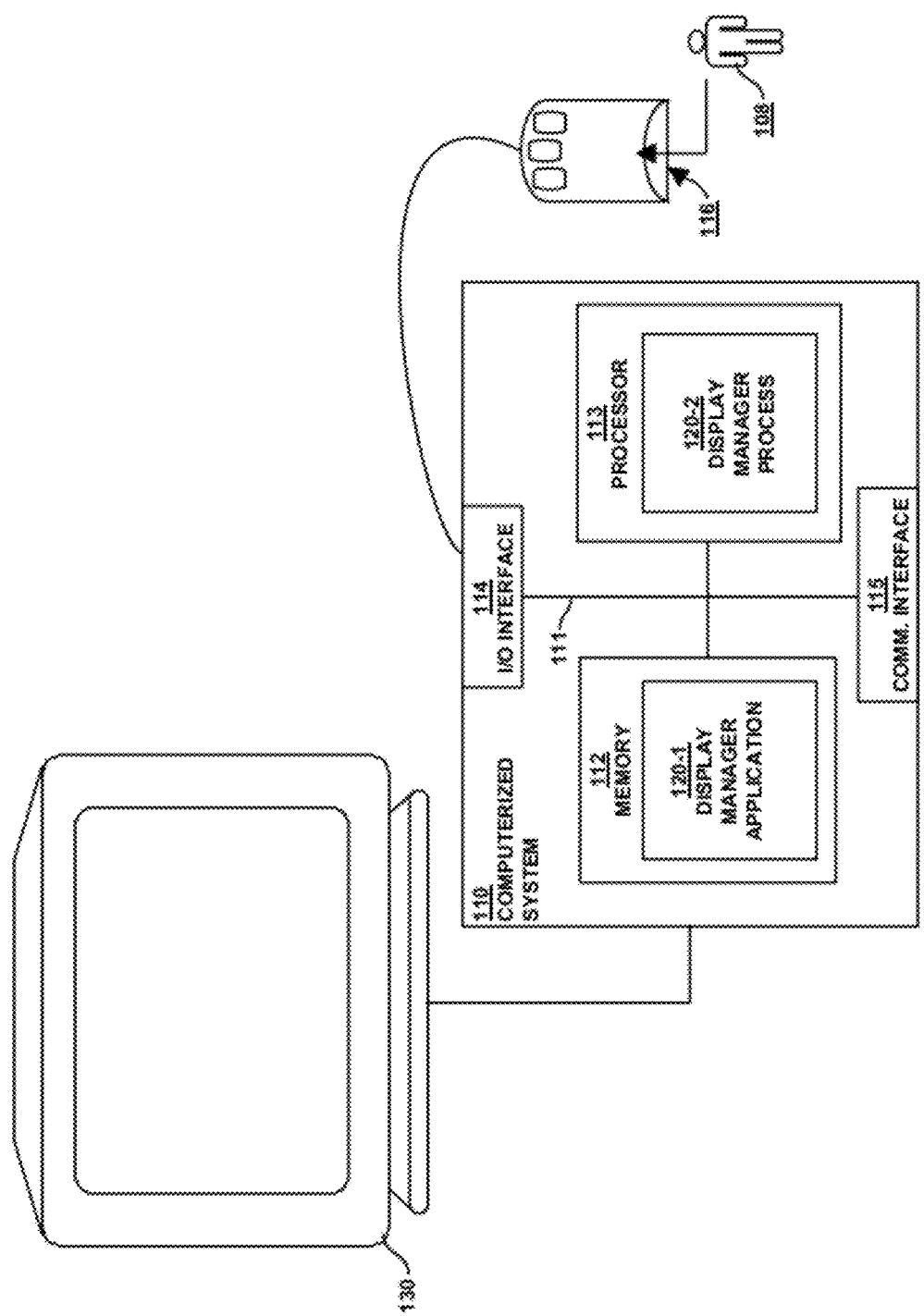
FIG. 19 is an example block diagram illustrating an architecture of a computer system that executes, runs, interprets, operates or otherwise performs a display manager application and/or a display manager process according to embodiments herein.

FIG. 19 is an example block diagram illustrating an architecture of a computer system 110 that executes, runs, interprets, operates or otherwise performs a display manager application 120-1 and/or display manager process 120-2 (e.g. an executing version of a display manager 120 as controlled or configured by user 108) according to embodiments herein.

Note that the computer system 110 may be any type of computerized device such as a personal computer, a client computer system, workstation, portable computing device, console, laptop, network terminal, etc. This list is not not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the display manager 120 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the display manager application 120-1 and/or the display manager process 120-2 can be distributed and executed in multiple nodes in a computer network environment or performed locally on a single computer.

The memory system 112 can be any type of computer readable medium (e.g., tangible computer readable medium) and, in this example, is encoded with a display manager application 120-1 that supports operations as discussed herein.

During operation of the computer system 110, the processor 113 accesses the memory system 112 via the interconnect 111 in order to launch, run, execute, interpret or otherwise perform the logic instructions of the display manager application 120-1. Execution of the display manager application 120-1 in this manner produces the display manager process 120-2. In other words, the display manager process 120-2 represents one or more portions or runtime instances of the display manager application 120-1 (or the entire application 120-1) performing or executing within or upon the processor 113 in the computerized device 110 at runtime.

Those skilled in the art will understand that the computer system 110 may include other processes and/or software and hardware components, such as an operating system. Display 130 need not be coupled directly to computer system 110. For example, the display manager application 120-1 can be executed on a remotely accessible computerized device via the communication interface 115. In this instance, the graphical user interface may be displayed locally to a user 108 of the remote computer, and execution of the processing herein may be client-server based.

The display manager application 120-1 may be stored on a computer readable medium (such as a floppy disk), hard disk, electronic, magnetic, optical, or other computer readable medium. It is understood that embodiments and techniques discussed herein are well suited for other applications as well.

Note again that techniques herein are well suited for a display manager 120 that allows a user to (more easily and efficiently) navigate about and view different portions of a semantic network via an interactive graphical user interface (G.U.I.) 140.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   based on a semantic network model defining relationships amongst multiple nodes in a semantic network, rendering a graphical user interface to include a first radial perspective of a portion of the semantic network as viewed from a first node of the semantic network;
   receiving selection of a second node of the semantic network displayed in the first radial perspective; and
   in response to receiving the selection, updating the graphical user interface to include a second radial perspective of a portion of the semantic network as viewed from the second node of the semantic network and providing a visual indication in the second radial perspective that the first node resides higher in a hierarchy than the second node.

2. The method as in claim 1, wherein rendering the graphical user interface to include the first radial perspective of the portion of the semantic network as viewed from the first node includes:
   displaying the first node in the first radial perspective as a centroid;
   displaying a set of branches emanating outward from the first node, the set of branches including: i) a first branch extending from the first node to the second node, and ii) a second branch extending from the first node to a third node of the semantic network.

3. The method as in claim 2, wherein receiving selection of the second node displayed in the first radial perspective includes receiving input indicating to render the second node as the centroid instead of rendering the first node as the centroid of the graphical user interface; and
   wherein updating the graphical user interface to include the second radial perspective further comprises: i) displaying the first node as one of multiple other nodes orbiting the second node, and ii) discontinuing display of the third node.

4. The method as in claim 3, wherein displaying the first node as one of multiple other nodes orbiting the second node further comprises: providing a visual indication in the second radial perspective that the other multiple nodes orbiting the second node reside lower in the hierarchy than the second node.

5. The method as in claim 1, wherein updating the graphical user interface to include the second radial perspective includes:
   displaying a center node in the second radial perspective;
   displaying a set of branches emanating outward from the center node to a set of satellite nodes orbiting the center node, the satellite nodes including a first satellite node and a second satellite node; and
   providing a visual indication that the first satellite node resides higher in a hierarchy than the center node and that the second satellite node resides lower in the hierarchy than the center node.

6. The method as in claim 1, wherein rendering the graphical user interface to include the second radial perspective of the portion of the semantic network as viewed from the second node includes:
   displaying the second node in the second radial perspective as a centroid;
   displaying a set of branches emanating outward from the second node, the set of branches including: i) a first branch extending from the second node to the first node, and ii) a second branch extending from the second node to a third node of the semantic network.

7. The method as in claim 6, wherein displaying the set of branches emanating outward from the second node includes displaying a third branch emanating outward from the second node to a fourth node to indicate a relationship between the second node and the fourth node, the method further comprising:
   displaying the fourth node to include multiple satellite nodes having respective branches to the fourth node, which is a centroid with respect to the multiple satellite nodes.

8. The method as in claim 7 further comprising: displaying a given satellite node of the multiple satellite nodes as having multiple branches including:
   a branch between the given satellite node and the fourth node as well as a branch between the given satellite node and the second node.

9. The method as in claim 7 further comprising:
   providing a visual indication that the first node is a human type of resource and the fourth node represents a domain to which the first node is associated.

10. The method as in claim 7 further comprising:
    providing a visual indication that the second node and third node are part of a first network of resources associated with the first node;
    providing a visual indication that the nodes orbiting the fourth node are part of a second network of resources associated with the fourth node; and
    providing a visual indication that the third branch defines a relationship between the first node and the fourth node.

11. The method as in claim 1 further comprising:
    displaying the second radial perspective to include a first network of resources related to the second node;
    displaying the second radial perspective to include a second network of resources related a domain node, the second network centered on the domain node, the resources of the second network orbiting the domain node; and
    displaying a branch connecting the domain node and the second node to indicate that the second node is a member of a domain represented by the domain node, the branch thereby indicating an indirect relationship between the second node and the resources of the second network.

12. The method as in claim 11, further comprising:
    allowing for selection of one of the first network and second network; and
    filtering the second radial perspective to include a display of a selected network and to minimize display of an unselected network.

13. The method as in claim 1, wherein updating the graphical user interface to include the second radial perspective comprises:
    displaying the first node and a set of multiple other nodes as satellite nodes with respect to the second node; and
    via radial lines emanating outward from the second node, providing a visual indication in the second radial perspective: i) that the first node resides higher in a hierarchy than the second node and ii) that each node in the set of multiple other nodes orbiting the second node reside lower in the hierarchy than the second node.

14. The method as in claim 1, comprising:
    utilizing a first edge node declaration associated with the first node to identify which portion of the semantic network to display in the first radial perspective; and
    utilizing a second edge node declaration associated with the second node to identify which portion of the semantic network in the second radial perspective.

15. A method comprising:
receiving selection of a resource;
utilizing a semantic network model associated with a navigable semantic network to identify expertise information and human resource information associated with the selected resource; and
displaying a portion of the navigable semantic network in a graphical user interface, the displayed portion of the navigable semantic network including the expertise information and human resource information associated with the selected resource, wherein displaying the portion of the navigable semantic network comprises displaying the selected resource as a centroid node and displaying orbiting nodes connected with branches to the centroid node, the orbiting nodes representing the expertise information.

16. The method as in claim 15, wherein displaying the portion of the navigable semantic network includes displaying a set of branches emanating radially outward from the centroid node to orbiting nodes.

17. The method as in claim 16 further comprising:
enabling selection of nodes of the navigable semantic network for viewing of documentation associated with the selected human resource at the centroid.

18. The method as in claim 15, wherein receiving the selection of the resource includes receiving selection of a human resource; and
wherein displaying the portion of the navigable semantic network includes:
ii) displaying a first set of branches emanating radially outward from the centroid node to orbiting nodes, the orbiting nodes representing areas of expertise associated with the selected human resource; and
iii) displaying a second set of branches emanating radially outward from the orbiting nodes to illustrate corresponding multiple human resources in addition to the selected human resource that share a same area of expertise as the selected human resource at the centroid node.

19. The method as in claim 18, wherein displaying the first set of branches includes: i) displaying a first branch from the centroid node to a first orbiting node representing a first area of expertise, and ii) displaying a second branch from the centroid node to a second orbiting node representing a second area of expertise; and
wherein displaying the second set of branches includes: i) providing an indication that a first group of human resources share the first area of expertise with the human resource, and ii) providing an indication that a second group of human resources share the second area of expertise with the human resource.

20. The method as in claim 19 further comprising:
displaying the orbiting nodes in a first level concentric circle about the centroid; and
displaying the corresponding multiple human resources other than the selected human resource as a second level concentric circle about the centroid.

21. The method as in claim 15, wherein receiving the selection of the resource includes receiving selection of a human resource; and
wherein initiating display of the portion of the navigable semantic network in the graphical user interface includes: i) initiating display of the selected resource, and ii) initiating display of expertise information as a concentric set of area-of-expertise nodes around the selected resource, the method further comprising:
upon selection of an area-of-expertise node in the set, modifying the displayed portion of the semantic network model by:
i) initiating display of the selected area-of-expertise node as a centroid; and
ii) initiating display of a set of human resources in a concentric manner around the selected area-of-expertise node, the set of human resources including the selected human resource as well as other human resources sharing a same area of expertise as identified by the selected area-of-expertise node.

22. The method as in claim 15, wherein initiating display of the portion of the navigable semantic network in the graphical user interface includes displaying selectable nodes in relation to the selected resource to enable selection and viewing of documentation associated with the selected resource.

23. A computer readable medium comprising executable instructions encoded thereon operable on a computerized device to perform processing comprising:
based on a semantic network model defining relationships amongst multiple nodes in a semantic network, instructions for rendering a graphical user interface to include a first radial perspective of a portion of the semantic network as viewed from a first node of the semantic network;
instructions for receiving selection of a second node of the semantic network displayed in the first radial perspective; and
in response to receiving the selection, instructions for updating the graphical user interface to include a second radial perspective of a portion of the semantic network as viewed from the second node of the semantic network and to provide a visual indication in the second radial perspective that the first node resides higher in a hierarchy than the second node.

24. The computer readable medium as in claim 23, wherein the instructions for rendering the graphical user interface to include the first radial perspective of the portion of the semantic network as viewed from the first node include:
instructions for displaying the first node in the first radial perspective as a centroid;
instructions for displaying a set of branches emanating outward from the first node, the set of branches including: i) a first branch extending from the first node to the second node, and ii) a second branch extending from the first node to a third node of the semantic network.

25. The computer readable medium as in claim 24, wherein the instructions for receiving selection of the second node displayed in the first radial perspective include:
instructions for receiving input indicating to render the second node as the centroid instead of rendering the first node as the centroid of the graphical user interface; and
wherein the instructions for updating the graphical user interface to include the second radial perspective further comprises: i) instructions for displaying the first node as one of multiple other nodes orbiting the second node, and ii) instructions for discontinuing display of the third node.

26. The computer readable medium as in claim 25, wherein the instructions for displaying the first node as one of multiple other nodes orbiting the second node further include:
instructions for providing a visual indication in the second radial perspective that the other multiple nodes orbiting the second node reside lower in the hierarchy than the second node.

27. The computer readable medium as in claim 25, wherein the instructions for updating the graphical user interface to include the second radial perspective include:
  instructions for displaying a center node in the second radial perspective;
  instructions for displaying a set of branches emanating outward from the center node to a set of satellite nodes orbiting the center node, the satellite nodes including a first satellite node and a second satellite node; and
  instructions for providing a visual indication that the first satellite node resides higher in a hierarchy than the center node and that the second satellite node resides lower in the hierarchy than the center node.

28. The computer readable medium as in claim 25, wherein the instructions for rendering the graphical user interface to include the second radial perspective of the portion of the semantic network as viewed from the second node include:
  instructions for displaying the second node in the second radial perspective as a centroid; and
  instructions for displaying a set of branches emanating outward from the second node, the set of branches including: i) a first branch extending from the second node to the first node, and ii) a second branch extending from the second node to a third node of the semantic network.

29. The computer readable medium as in claim 28, wherein the instructions for displaying the set of branches emanating outward from the second node includes displaying a third branch emanating outward from the second node to a fourth node to indicate a relationship between the second node and the fourth node, the method further includes:
  instructions for displaying the fourth node to include multiple satellite nodes having respective branches to the fourth node, which is a centroid with respect to the multiple satellite nodes.

30. A computer system comprising:
  a processor;
  a memory unit that stores instructions associated with an application executed by the processor; and
  an interconnect coupling the processor and the memory unit, enabling the computer system to execute the application and perform operations of:
    receiving selection of a resource;
    utilizing a semantic network model associated with a navigable semantic network to identify expertise information and human resource information associated with the selected resource; and
    displaying a portion of the navigable semantic network in a graphical user interface, the displayed portion of the navigable semantic network including the expertise information and human resource information associated with the selected resource, wherein displaying the portion of the navigable semantic network comprises displaying the selected resource as a centroid node and displaying orbiting nodes connected with branches to the centroid node, the orbiting nodes representing the expertise information.

31. A method comprising:
  based on a semantic network model defining relationships amongst multiple nodes in a semantic network, rendering a graphical user interface to include a first radial perspective of a portion of the semantic network as viewed from a first node of the semantic network;
  receiving selection of a second node of the semantic network displayed in the first radial perspective; and
  in response to receiving the selection, updating the graphical user interface to include a second radial perspective of a portion of the semantic network as viewed from the second node of the semantic network and providing a visual indication that the first node is a human type of resource and that another node represents a domain to which the first node is associated.

32. A method comprising:
  based on a semantic network model defining relationships amongst multiple nodes in a semantic network, rendering a graphical user interface to include a first radial perspective of a portion of the semantic network as viewed from a first node of the semantic network;
  receiving selection of a second node of the semantic network displayed in the first radial perspective; and
  in response to receiving the selection, updating the graphical user interface to include a second radial perspective of a portion of the semantic network as viewed from the second node of the semantic network and providing a visual indication that a second and a third node are part of the first network of resources and a visual indication that nodes orbiting a fourth node are part of a second network of resources.

33. A method comprising:
  based on a semantic network model defining relationships amongst multiple nodes in a semantic network, rendering a graphical user interface to include a first radial perspective of a portion of the semantic network as viewed from a first node of the semantic network;
  receiving selection of a second node of the semantic network displayed in the first radial perspective; and
  in response to receiving the selection, updating the graphical user interface to include a second radial perspective of a portion of the semantic network as viewed from the second node of the semantic network, the graphical user interface displaying the first radial perspective displaying a first network of resources and the second radial perspective displaying a second network of resources.

* * * * *

UNITED STATES PATENT AND TRADEMARK OFFICE
CERTIFICATE OF CORRECTION

PATENT NO. : 8,332,782 B1
APPLICATION NO. : 12/035617
DATED : December 11, 2012
INVENTOR(S) : Walter Chang et al.

It is certified that error appears in the above-identified patent and that said Letters Patent is hereby corrected as shown below:

Column 27, Claim 18, Line 31:

Delete "ii" and Insert --i--

Column 27, Claim 18, Line 36:

Delete "iii" and Insert --ii--

Signed and Sealed this
Nineteenth Day of March, 2013

Teresa Stanek Rea
*Acting Director of the United States Patent and Trademark Office*